United States Patent [19]

Ross et al.

[11] Patent Number: 6,026,417
[45] Date of Patent: Feb. 15, 2000

[54] DESKTOP PUBLISHING SOFTWARE FOR AUTOMATICALLY CHANGING THE LAYOUT OF CONTENT-FILLED DOCUMENTS

[75] Inventors: Benjamen E. Ross, Mount Vernon; Michael D. Schackwitz, Belleview; Kenneth L. Young, Redmond, all of Wash.

[73] Assignee: Microsoft Corporation, Redmond, Wash.

[21] Appl. No.: 08/848,976

[22] Filed: May 2, 1997

[51] Int. Cl.[7] ................................................. G06F 17/30
[52] U.S. Cl. .......................... 707/517; 707/100; 707/513; 707/530; 707/501; 707/3; 707/4; 707/5
[58] Field of Search ..................................... 707/100, 500, 707/513, 514, 517, 530, 501, 3, 4, 5

[56] References Cited

U.S. PATENT DOCUMENTS

| | | | |
|---|---|---|---|
| 5,210,852 | 5/1993 | Sato | 707/1 |
| 5,323,312 | 6/1994 | Saito et al. | 364/419.1 |
| 5,349,648 | 9/1994 | Handley | 395/148 |
| 5,404,439 | 4/1995 | Moran et al. | 345/326 |
| 5,434,966 | 7/1995 | Nakazawa et al. | 395/161 |
| 5,438,512 | 8/1995 | Mantha et al. | 364/419.1 |
| 5,454,103 | 9/1995 | Coverston et al. | 707/205 |
| 5,459,826 | 10/1995 | Archibald | 395/147 |
| 5,467,472 | 11/1995 | Williams et al. | 707/1 |
| 5,515,536 | 5/1996 | Corbett et al. | 709/305 |
| 5,555,362 | 9/1996 | Yamashita et al. | 395/145 |
| 5,566,295 | 10/1996 | Cypher et al. | 345/326 |
| 5,579,521 | 11/1996 | Shearer et al. | 709/300 |
| 5,600,771 | 2/1997 | Hayashi et al. | 395/774 |
| 5,608,857 | 3/1997 | Ikeo et al. | 395/761 |
| 5,613,090 | 3/1997 | Willems | 709/302 |
| 5,613,124 | 3/1997 | Atkinson et al. | 345/433 |
| 5,634,019 | 5/1997 | Koppolu et al. | 345/335 |
| 5,649,216 | 7/1997 | Sieber | 395/767 |
| 5,652,879 | 7/1997 | Harris et al. | 707/101 |
| 5,664,127 | 9/1997 | Anderson et al. | 345/333 |
| 5,669,006 | 9/1997 | Joskowich et al. | 395/779 |
| 5,680,616 | 10/1997 | Williams et al. | 707/103 |
| 5,682,510 | 10/1997 | Zimmerman et al. | 345/352 |
| 5,717,945 | 2/1998 | Tamura | 395/800 |
| 5,732,403 | 3/1998 | Nakamura | 707/514 |
| 5,742,837 | 4/1998 | Fukui et al. | 395/779 |
| 5,781,785 | 7/1998 | Rowe et al. | 395/774 |
| 5,860,073 | 1/1999 | Ferrel et al. | 707/522 |
| 5,890,177 | 3/1999 | Moody et al. | 707/511 |

OTHER PUBLICATIONS

Simpson, Alan "Mastering WordPerfect 5.1 & 5.2 For Windows", Sybex, Inc. 1993 487–489.

Microsoft Press, *OLE 2 Programmer's Reference*, vol. One, Working with Windows™ Objects, Copyright 1994 by Microsoft Corporation, Appendix B, pp. 857–879.

Benjamin E. Ross, Michael E. Schackwitz and Kenneth L. Young; Desktop Publishing Software for Automatically Changing the Layout of Content–filled Documents; May 2, 1997; "i publish" handbook. The applicants believe that the software described by this manual was on sale in this country before the filing date of the referenced application.

*Primary Examiner*—Wayne Amsbury
*Assistant Examiner*—Shahid Alam
*Attorney, Agent, or Firm*—Jones & Askew, LLP

[57] ABSTRACT

A publisher program for automatically changing the layout of content-filled desktop publishing documents. The publisher program allows the author of a document to use a menu-driven utility to define a first layout for the document. A program module known as a Wizard then renders a document in the first layout. The author makes changes to the document while the document is in the first layout, typically by adding content and making author-defined changes to the document rendered by the Wizard. The author may then return to the menu-driven utility to select a second layout for the document. The Wizard renders a document in the second layout and a program module known as a Page Manager automatically applies the author's changes to the document and renders a content-filled document in the second layout.

36 Claims, 18 Drawing Sheets

| OBJECT NUMBER | SIZE OVERRIDE | | | | LOCATION OVERRIDE | | ANGLE OVERRIDE | | SOURCE SIZE | |
|---|---|---|---|---|---|---|---|---|---|---|
| | L | T | R | B | FROM | TO | FROM | TO | HEIGHT | WIDTH |
| 1 | -30 | -20 | 40 | 25 | 10,20 | 30,40 | 20 | 45 | 15 | 10 |
| 2 | % | % | % | % | X,Y | X',Y' | ANGLE | ANGLE' | # | # |
| ⋮ | ⋮ | ⋮ | ⋮ | ⋮ | ⋮ | ⋮ | ⋮ | ⋮ | ⋮ | ⋮ |
| N | % | % | % | % | X,Y | X',Y' | ANGLE | ANGLE' | # | # |

1802

DESKTOP PUBLISHING SOFTWARE FOR AUTOMATICALLY CHANGING THE LAYOUT OF CONTENT-FILLED DOCUMENTS

TECHNICAL FIELD

The present invention relates to improved desktop publishing software and, more particularly, relates to a publisher program that allows the author of a content-filled document to use a menu-driven utility to automatically change the layout the document.

BACKGROUND OF THE INVENTION

Desktop publishing software programs for personal computers have been available for a number of years. These desktop publishing programs typically allow the author of a document to specify a layout for the document prior to entering content into the document. The author of the document typically selects a set of options from a menu-driven utility and the publishing program automatically produces a generic layout based on the selections made by the author. The author then enters content into the layout to complete the document. Although the author may manually alter the layout one object at a time, the author cannot use the menu-driven utility to automatically alter the entire layout after content has been added to the document. That is, the menu-driven automatic layout utility only operates at the beginning of the document creation process to create a generic layout; it cannot operate on a document that contains author-defined content.

These prior desktop publishing programs have significant shortcomings. For example, consider an author who selects a two-column, horizontal masthead layout for a newsletter. The author selects these parameters from the menu-driven utility, and then enters the content into the document. When the document is complete, the author shows the newsletter to an editor who says, "Great, now lets see it in a three-column layout. I also want to try a four-column layout with a vertical masthead." Unfortunately for the author, these new layouts cannot be created by simply returning to the menu-driven utility and selecting the new layout parameters. To create the new layouts, the author may start over from scratch for each new layout, which requires that the content of the newsletter be entered anew for each new layout. Alternatively, the author may alter the completed two-column newsletter one object at a time to produce each new layout. With either option, the process is time consuming and tedious.

There is, therefore, a need for improved desktop publishing software that allows the author of a content-filled document to use a menu-driven utility to automatically change the layout of the document.

SUMMARY OF THE INVENTION

The invention meets the needs described above by providing a publisher program that allows the author of a content-filled document to use a menu-driven utility to automatically change the layout the document. More specifically, the publisher program allows the author of a document to use a menu-driven utility to select a first layout for the document. A first program module known as a Wizard then renders a document in the first layout. The author makes changes to the document while the document is in the first layout, typically by adding content and making author-defined changes to the document rendered by the first program module. The author may then return to the menu-driven utility to select a second layout for the document. The Wizard renders a document in the second layout and a second program known as a Page Manager automatically applies the author's changes to the document and renders a content-filled document in the second layout. The author may return to the menu-driven utility any number of times to obtain different layouts for the content-filled document without having to reenter the content into each new layout.

Generally described, the invention includes a computer-readable medium having computer-readable instructions for implementing the publisher program. User input is received from a menu-driven layout utility to define a first layout for a document, and a document in the first layout is rendered. User changes are then received to the document in the first layout. User input is then received from the menu-driven layout utility to define a second layout for the document, and a document is rendered in the second layout. The user changes are automatically applied to the document in the second layout.

According to an aspect of the invention, in response to the input from the menu-driven layout utility defining the first layout for the document, a source object property list defining the first layout for the document is created and a source object list is generated from the source object property list. In response to the input from the menu-driven layout utility defining the second layout for the document, a destination object property list defining the second layout for the document is created and a destination object list is generated from the destination object property list. In response to the user changes, the source object list is modified to create an object list for a current publication. An object list for a new publication is created by initially defining the object list for the new publication to be the same as the destination object list, and then comparing the source object list to the destination object list. For an object in the source object list that has a corresponding object in the destination object list, it is determined whether the object in the source object is different from a corresponding object in the object list for the current publication and, if the object in the source object is different from the corresponding object in the object list for the current publication, a corresponding object in the object list for the new publication is modified to match the corresponding object in the object list for the current publication. For an object that appears in the object list for the new publication that does not have a corresponding object in the source object list, a corresponding object is added to the object list for the new publication. And for an object that appears in the source object list that does not have a corresponding object in the object list for the current publication, a corresponding object is deleted in the object list for the new publication.

The step of automatically applying the user changes to the document in the second layout may include applying formatting changes, applying position changes, and applying content changes. The step of automatically applying position changes may include automatically applying size changes, automatically applying location changes, and automatically applying angle changes.

The step of automatically applying size changes may include determining whether the proportions of an object in the document in the first layout prior to user changes are similar to the proportions of a corresponding object in the document in the second layout, and if the proportions of the object in the document in the first layout prior to user changes are similar to the proportions of the corresponding object in the document in the second layout, applying user changes received for the object in the document in the first layout to the corresponding object in the document in the second layout.

In addition, the step of automatically applying size changes may include some steps that apply only to size changes, such as determining whether an object in the document in the first layout overlaps the object after the user changes have been applied to the object, and if the object in the document in the first layout overlaps the object after the user changes have been applied to the object, applying the user changes received for the object in the document in the first layout to the corresponding object in the document in the second layout.

The step of automatically applying size changes may also include determining a first set of proportionate edge values for an object in the document in the first layout prior to user changes, applying one of the user changes to the object, determining a second set of proportionate edge values for the object after the user change has been applied to the object. The second set of proportionate edge values may be defined with respect to the first set of proportionate edge values, and the second set of proportionate edge values may be saved as a user-defined change for the object.

The step of automatically applying location changes may include determining whether the location of an object in the document in the first layout prior to user changes is similar to the location of a corresponding object in the document in the second layout, and if the location of the object in the document in the first layout prior to user changes is similar to the location of the corresponding object in the document in the second layout, applying user changes received for the object in the document in the first layout to the corresponding object in the document in the second layout.

The step of automatically applying angle changes may include determining whether the angle of an object in the document in the first layout prior to user changes is similar to the angle of a corresponding object in the document in the second layout, and if the angle of the object in the document in the first layout prior to user changes is similar to the angle of the corresponding object in the document in the second layout, applying user changes received for the object in the document in the first layout to the corresponding object in the document in the second layout.

According to another aspect of the invention, a computer-readable medium having computer-readable instructions includes a menu-driven utility for receiving a first set of user selections that define a first layout for a document, a first program module for rendering a first document in the first layout in response to the first set of user selections, and an editor for altering the first document in response to user changes. The menu-driven utility is further operable for receiving a second set of user selections that define a second layout. The first program module is further operable for rendering a second document in the second layout in response to the second set of user selections. The computer-readable instructions further include a second program module for automatically applying to the second document the user changes received for the first document.

According to yet another aspect of the invention, a computer-storage medium includes a plurality of data fields that represent a data structure. The data structure includes a plurality of records, each record corresponding to an object in a document created by a publisher program, the document including a plurality of layouts for the document. Each record includes a size data field for defining the size of the object in a particular one of the layouts, a location data field for defining the location of the object in the particular layout, and an angle data field for defining the angle of the object in the particular layout. The size field may include proportionate edge values that define a rectangular area within which contents associated with the object is displayed. The proportionate edge values may include a left edge value, a top edge value, a right edge value, and a bottom edge value. The location data field may include a coordinate value defining the location of the object. And the angle data field may include an angle value defining the angle of the object. In addition, the record for an object may include another data field for storing formatting information.

In summary, a present invention provides an improved publisher program for desktop publishing software that allows the author of a content-filled document to use a menu-driven utility to automatically change the layout the document. That the invention improves over the drawbacks of the prior art and accomplishes these advantages will become apparent from the following detailed description of the exemplary embodiments and the appended drawings and claims.

DETAILED DESCRIPTION

The present invention may be implemented as a publisher program for a desktop publishing system that allows the author of a content-filled document to use a menu-driven utility to automatically change the layout the document. In one embodiment, the invention may be incorporated into a desktop publishing application program entitled "PUBLISHER '98" (although a different name may be adopted prior to distribution) marketed by Microsoft Corporation of Redmond, Wash. Briefly described, the program allows the author of a document to use a menu-driven utility to select a first layout for the document. A program module known as a Wizard then renders a generic document in the first layout. The author makes changes to the generic document while the it document is in the first layout, typically by adding content and making author-defined changes to the document rendered by the Wizard. The author may then return to the menu-driven utility to select a second layout for the document. The Wizard renders a generic document in the second layout and the publisher program system automatically applies the author's changes to the document and renders a content-filled document in the second layout.

Exemplary Operating Environment

Figure 1A:
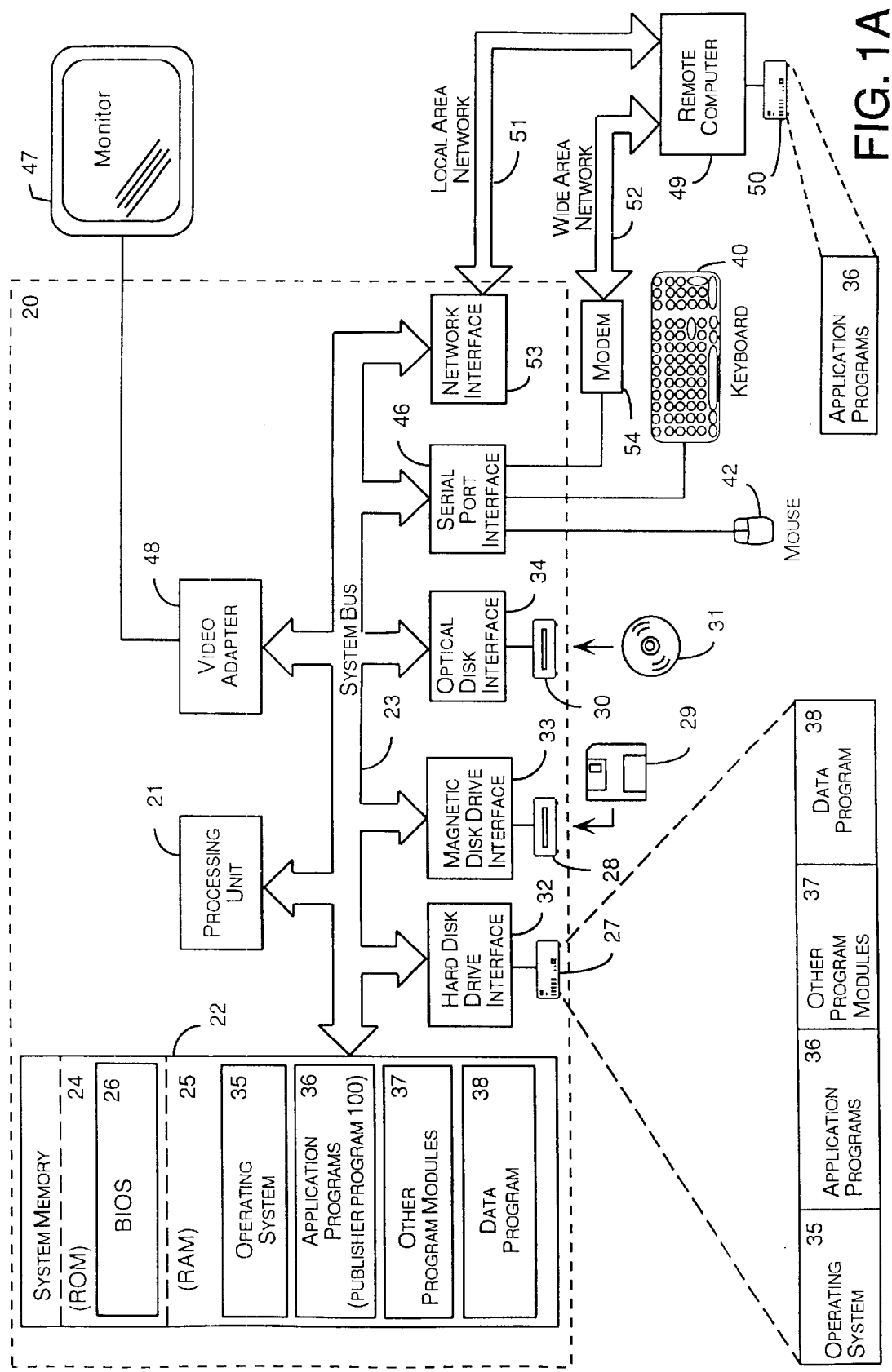
FIG. 1A is a block diagram of the personal computer that provides the operating environment for the exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only, memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the application programs 36 is a publisher program 100 that includes certain embodiments of the invention, which are described in detail below with reference to FIGS. 2–19. An author of a document may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The Object Property Lists Operating Environment

Data in a computer takes many forms. Some formats are processor-motivated, whereas other formats are algorithm-motivated. An integer, which is an example of a processor-motivated data format, is often stored in a single CPU register. An integer may have many different meanings: it could be a measurement, an index, a set of bitfields, and so forth. The definition of a particular integer may be set using the CPU instruction set.

A null-terminated string is an example of an algorithm-motivated data format. A null-terminated string can have many meanings: it may define a filename, a word, the user's name, etc. Null-terminated string are more flexible that integers and, therefore, may be conveniently used to store a wider range of information. In a null-terminated string, there is an explicit contract about how multiple pieces of data are to be interpreted. In memory, a null-terminated string is a series of characters followed by a zero. Any author of data strings can put bytes down in this format to define null-terminated strings. A typical null-terminated-string programming environment includes a number of helper functions that make the job of writing and manipulating null-terminated strings easier. For example, helper functions may be called to identify the length of the string, concatenate two strings together, and so forth. In addition, many programming environments allow system developers to define new helper functions on an as-needed basis.

Like a null-terminated string, an Object Property List (OPL) is an algorithm-motivated data format. OPLs may be used to store multiple pieces of information about something, such as an object in a desktop publishing document. An OPL is a contiguous data structure, which may become quite large if it is used to store a large amount of data. In addition, a parent OPL may include one or more smaller OPL that are nested within the parent OPL. Any author may put bytes down in the OPL format to make an OPL. And the OPL environment includes a number of helper functions that make creating and manipulating OPLs easier. The purposes of OPLs are as varied as the purposes of integers or null-terminated strings. Each piece of information in an OPL could be an integer, a Boolean value, a string, etc.

For example, an OPL may be used to describe the formatting, position, or content of an object. Each property of an object is represented by a separate piece of OPL data (one piece for each border, one for the fill color, one for the fill type, etc.). Two formatting OPLs may therefore be compared piece by piece to detect the specific differences. Moreover, an entire OPL may have multiple meanings: sometimes an OPL stores the formatting of an object, sometimes an OPL stores position of the object, sometimes an OPL stores content of an object, sometimes an OPL stores a user's changes to the formatting, position, or content, sometimes an OPL stores a general descriptor for the publication.

Thus, a single OPL could be used to store all of the attributes of a desktop publishing document. But the OPL data format is not amenable to storing this much data. This is because using a single OPL to define an entire desktop publishing document would required a very large contiguous block of memory. Therefore, a desktop publishing document is typically stored as an Object List (OL), which is a plurality of OPL-like descriptors that define the attributes of each object of the document. Each entry in an OL is essentially at graft from the OPL data format having a size that has a convenient memory footprint. An entire desktop publishing document, therefore, is preferably described by an OL in which each entry is a stand-alone object property definition or set of object property definitions in OPL format that may be separately stored and manipulated.

Accordingly, each document created with the publisher program 100 is constructed from a plurality of objects, each of which may be a line, a shape, a text frame, an OLE frame, or a picture frame. For more comprehensive information regarding OLE and OLE Automation, please refer to the "OLE 2 Programmer's Reference" published by Microsoft Press. Each object has a set of object properties defining its layout, including its name, type, position, formatting, and content. Each object is defined by these object properties. The name is a unique hierarchical identifier, such as an integer, that enables each object to be uniquely identified in an OPL. The hierarchical naming structure also allows an OL to be sorted or organized in a predefined order. The type specifies whether the object is a line, a shape, a text frame, an OLE frame, or a picture frame. The position, which includes the object's size, location, and angle, defines the location of the object in the document. Formatting includes settings, such as color and font type and size, for content contained within the object. The content defines material to be rendered along with the object, such as text or a pictures (e.g., a bit map).

In addition, the publisher program 100 uses a small OPL (usually under 50 bytes) that describes the properties the user has chosen for a publication from a menu-driven utility. This OPL is called the "Controlling OPL." A program module known as a "Wizard" then converts the Controlling OPL into a much-larger OL, which contains the formatting, position, and content definitions for each object on each page of the document. In the OL, the formatting, position, and content of each object is represented by a small OPL.

The publisher program 100 stores and manipulates the document by storing and manipulating the document's OL. The process of rendering an electronic document, therefore, involves retrieving the document's OL from storage and loading the document into memory address space in accordance with the instructions included within the OL. In addition, because every object in an OL includes a unique name, logical and arithmetic operations may be performed on two or more OLs. For example, the difference between two OLs may be computed, which returns the objects in the first OL that are not also found in the second OL. This allows author-defined changes to an object to be identified by locating the object with the same name in two OLs and identifying the differences between the object's properties. Thus, author-defined changes to the type, position, formatting, and content may be identified for each object in any two OLs.

It will therefore be appreciated that OPLs are extensible, persistable descriptions of object properties that enable powerful arithmetic functionality to perform difficult tasks without requiring any knowledge of the meaning of the data included within the individual objects. In addition, OLs are highly optimized extrapolations of OPLs, which may also be manipulated by powerful arithmetic functionality. As a result, existing OPLs and OLs and the logic for manipulating them does not need to be rewritten as new object and properties are defined.

The Publisher Program 100

Figure 1B:
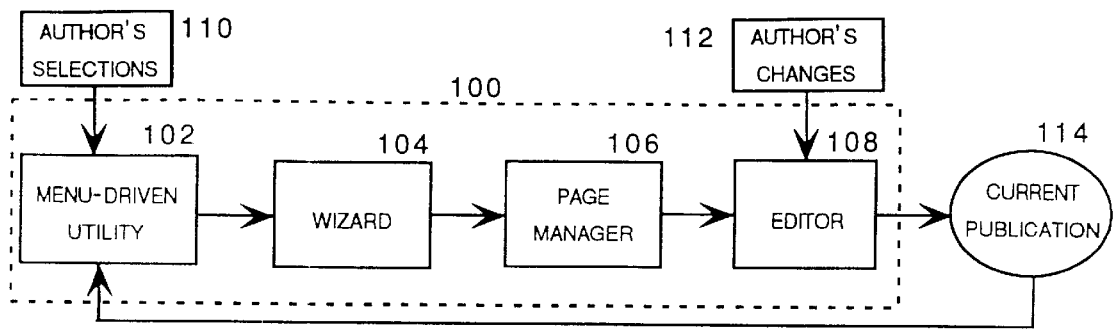
FIG. 1B is a functional block diagram of a publisher program according to an exemplary embodiment of the present invention.

FIG. 1B is a functional block diagram of the publisher program 100, which includes four principal program modules: a menu-driven layout selection utility 102, a Wizard 104, a Page Manager 106, and an editor 108. The author of a document begins by entering a set of selections 100 into the menu-driven layout selection utility 102 to define the layout of the document that the author wants to create. The Wizard 104 translates the author's selections 110 into a generic document conforming to the layout defined by the author's selections 110. The Page Manager 106 then adds previously-saved author-defined changes to the generic document rendered by the Wizard 104 to produce a content-filled document that is passed to the editor 108. The author may then make additional changes 112 to the content-filled document rendered by the Page Manager 106 to complete the current publication 114. As indicated by the feedback loop from the current publication 114 to the menu-driven layout selection utility 102, the author may return to the menu-driven layout selection utility 102 to change the layout of the current publication 114 after the user has added content to the current publication 114.

The Page Manager 106 represents a substantial improvement over prior publishing programs. These prior publishing programs may include a menu-driven utility that allows the author to enter a set of selections that defines a layout for a document. A program module similar to the Wizard 104 may then produce a generic document in the desired layout, which is passed to an editor for further modification by the author. But prior publisher programs stop at this point, leaving it up to the author to add the desired content to complete the document in the selected layout. Therefore, if the author wants to view the same document in more than one layout, the author must add the same content to each layout. This is because the prior publishing programs cannot add previously-saved author-defined content to a document in a new layout.

The Page Manager 106 improves over these prior publisher programs by automatically adding previously-saved author-defined changes to the document in the new layout. Thus, the publisher program 100 allows the author to return to the menu-driven layout selection utility 102 any number of times to define new layouts for the same document. Each time, the Wizard 104 translates the author's selections 110 into a generic document conforming to the new layout and the Page Manager 106 adds the previously-saved author-defined changes to the generic document. The author may therefore view the same content-filled document in any number of different layouts without having to reenter the content into each new layout.

The menu-driven utility 102 and the Wizard 104 make it easy for the author to define the layout of a document. Because most documents may be initially defined by standard layout parameters, requiring the author to begin each new document with a blank page would force the author to enter a lot of basic formatting information into each new document. This is a tedious and time-consuming process that most authors do not want to repeat unnecessarily. The Wizard 104 helps the author get started by accepting the menu-driven set of instructions 110 as input and rendering an automatically-formatted generic document as output. For the first version of the document, the Page Manager 106 has no previously-saved author-defined changes to apply to the generic document rendered by the Wizard 104. The generic document is therefore passed to the editor 108, which allows the author to add content and make changes to complete the document.

Typically, the objects in the initial document rendered by the Wizard 104 may be empty or they may include default content, such as an instruction like "insert title here," or Latin text or some other type of gibberish. The author of the document replaces this default content with author-defined content to complete the desired document. In completing the document, the author may also make a wide variety of other changed to the document rendered by the Wizard 104, such as adding or deleting objects, or changing the size, position, or formatting of objects.

More specifically, the preferred menu-driven utility 102 typically includes a first selection menu from which the author selects the type of publication that the author wants to create. The first selection menu typically includes a comprehensive list of the types of documents that the Wizard 104 can create, such as the following: newsletter, flyer, brochure, website, postcard, label, business form, letterhead, sign, business card, card & invitation, calendar, specialty, envelope, banner, and resume. After an author selects a particular document type, the menu-driven utility 102 presents the author with a list of selection items, which the author completes to further define the layout of the desired document. For example, if the author selects the newsletter document type, the menu-driven utility 102 may present the following list of selection items: number of columns=?; style=?; table of contents=?; and masthead=?. The author may then complete the list of selection items to further define the layout as follows: columns=2; style=jazzy; table of contents=yes; and masthead=horizontal.

Once the author has completed the list of selection items, the author activates the Wizard 104 to obtain the initial document. Continuing with the preceding example, the Wizard 104 accepts the menu-driven list of selection items (i.e., type=newsletter; columns=2; style=jazzy; table of contents=yes; and masthead=horizontal) as input, and produces a newsletter-type document with two columns, a jazzy-style font, a table of contents, and a horizontal masthead. Each object of the document produced by the Wizard 104, such as the columns of text, table of contents and masthead, may be empty or may include default content, such as an instruction like "insert title here," or Latin text or some other type of gibberish. The author then uses the editor 108 to enter the desired content into the document. For example, the author replaces the "insert title here" instruction that appears in the masthead object of the document with the actual title of the newsletter that the author wants to create; the author replaces the empty area or the gibberish text the appears in the columns of text objects of the document with the actual text of the newsletter articles that the author wants to create, etc. In completing the document, the author may also make other changes to the layout initially produced by the Wizard 104, such as changing the size and position of objects, inserting new objects such as picture frames, changing the size and font of text, etc.

After the author has used the editor 108 to alter the layout initially produced by the Wizard 104, including adding author-defined content to the document, the author may want to explore other layouts for the document. For example, when the document is complete, the author may show the newsletter to an editor who may says, "Great, now lets see it in a three-column layout. I also want to try a four-column layout in a more modern style, with a vertical masthead, and without a table of contents." To create each new layout, the author may return to the menu-driven utility 102 to select a new set of selections 110 that defines the new layout. For example, the author may again select the newsletter document type, but complete the list of selection items with an answer set defining a different layout, such as columns=4; style=modem; table of contents=no; and masthead=vertical.

The author may then activate the Wizard 104, which produces a new document conforming to the new scenario, in this case a newsletter-type document with four columns, a modem-style font, no table of contents, and a vertical masthead. As noted previously, prior publisher programs stop at this point, leaving it up to the author to once again add the desired content to complete the document in the new layout. The Page Manager 106 improves over these prior publisher programs by automatically adding the author-defined changes to the document in the new layout. This is a challenging task because the author created the content when the document was in the first layout. In some cases, the author-defined changes may not be compatible with the new layout. For example, if the author added content to the table of contents in the first layout changes, this author-defined content may not be compatible with a new layout that does not include a table of contents. The Page Manager 106 identifies this inconsistency and makes the decision to omit the author-defined changes for the table of contents in the new layout.

The Page Manager 106 must make many similar decisions, many of which are not as straight forward as the preceding table-of-contents example, to add the author-defined changes to a new layout. This is a complicated task because the Page Manager 106 must be able to handle every possible set of author-defined changes. From the viewpoint of an author using the publisher program 100, the operation of the Page Manager 106 is very simple. Indeed, the objective of the Page Manager 106 is to provide the author with what appears to be ultimate simplicity in changing the layout of desktop publishing documents. But from the software developer's viewpoint, this is a difficult challenge because the Page Manager 106 must be configured to handle all possible permutations and combinations of author input and Wizard 104 functionality. Moreover, it is important that the publisher program 100 be designed to operate efficiently so that computer resource requirements, such as processor time and memory storage, remain within acceptable ranges. The publisher program 100 addresses these problems so that it exhibits acceptable performance characteristics on generally available personal computer platforms, such as those using the 486 and "PENTIUM" microprocessors.

Furthermore, the Page Manager 106 is not limited to operating with any particular Wizard, or any particular set of specific document types or lists of selection items that might be defined by a Wizard. Rather, the Page Manager 106 is specifically configured to work with many different types of Wizards, including new Wizards that may be defined in the future. This is because the Wizard itself is not part of the Page Manager 106 that adds author-defined changes to new layouts. Rather, the Page Manager 106 is a separate entity of software that interfaces with the Wizard in an object-oriented operating environment. Programmers of the Wizard may alter the behavior of the Wizard in the future and, so on, as the redefined Wizard is configured to communicate with the Page Manager 106 using the appropriate predefined interfaces, the Page Manager 106 will interact properly with the redefined Wizard. In other words, the Page Manager 106 is configured to be forwardly compatible with new Wizards that may be developed in the future. Forward compatibility, also referred to as extensibility, is an important advantage of the publisher program 100 that inheres from the object-oriented operating environment in which the publisher program 100 is deployed.

Figure 1C:
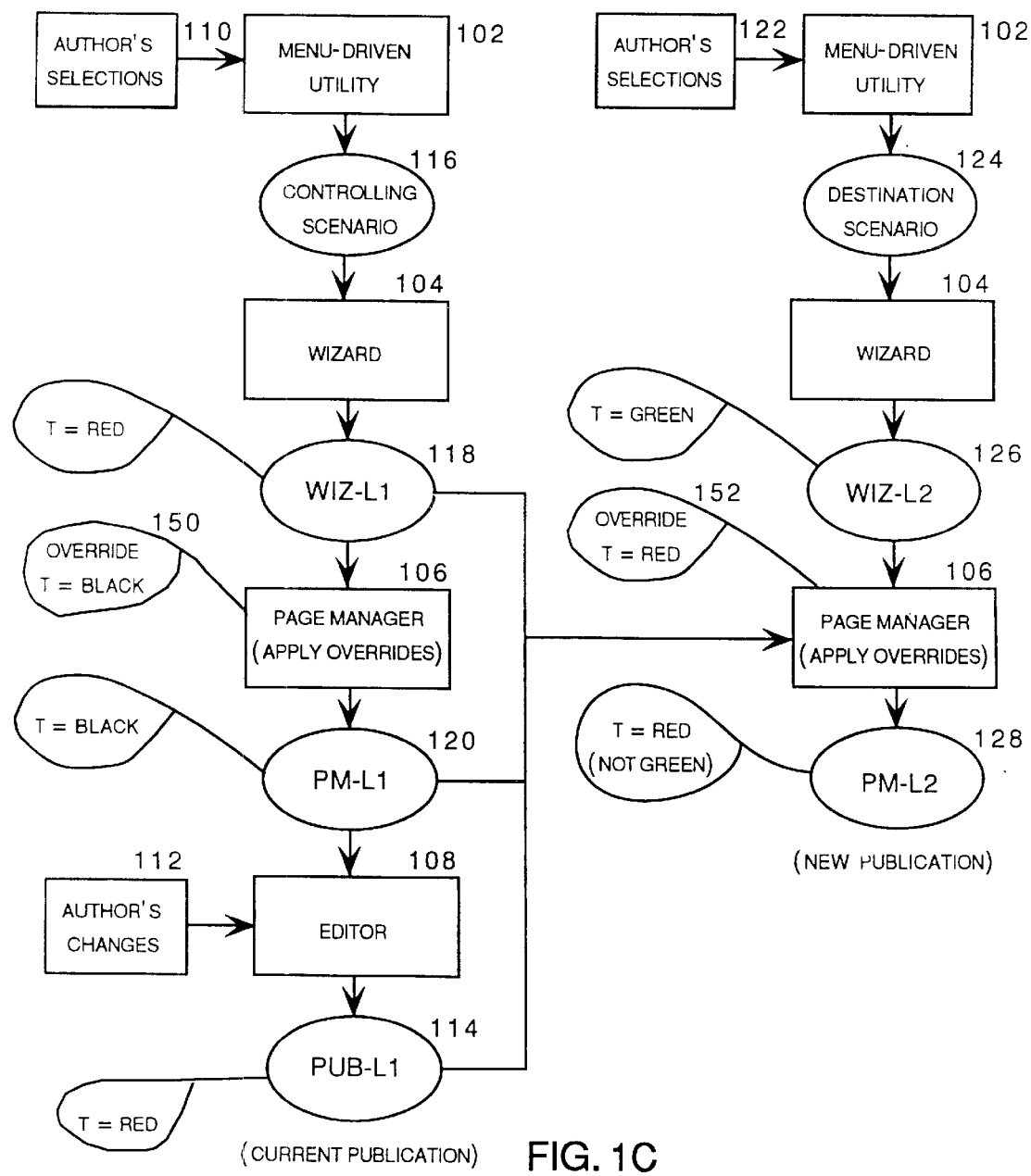
FIG. 1C is a functional block diagram illustrating the operation of the publisher program shown in FIG. 2.

FIG. 1C is a functional block diagram illustrating the operation of the publisher program 100. Because the publisher program 100 allows the author of a document to select different layouts for the same document, it is necessary to define a nomenclature for identifying the various scenarios and layouts for a particular document. Each different combination of menu-driven layout options defined by the Wizard 104 is known as a "scenario." The complete set of scenarios is known as the Wizard's "scenario set." For each scenario, the Wizard 104 renders a "layout," which is defined by an OPL that the publisher program 100 stores and manipulates.

In other words, the menu-driven utility 102 translates the author's selections 110 into a scenario that is provided to the Wizard 104, which renders a layout that corresponds to the scenario. Each scenario corresponds to only one layout; that is, the Wizard 104 produces the same layout every time it receives the corresponding scenario. The scenario that corresponds to the layout that is currently rendered by the publisher program 100 is known as the "controlling scenario" 116.

Each scenario is stored as an OPL that is preferably about 50 bytes in size. The Wizard produces a much larger object list (OL) for each layout. Each object list includes a number of objects, each of which includes a number of object properties that define the layout of the object, including its name, type, position, formatting, and content. Each object's position further defines the object's size, location, and angle, with respect to a coordinate system defined for the documents by the publisher program 100. The Wizard-produced OL corresponding to the controlling scenario 116 is known as the "source layout," or "WIZ-L1" 118, as shown on FIG. 1C.

The "WIZ-L1" nomenclature is particularly useful because the "WIZ" label indicates that this particular OL (i.e., the source layout) was rendered by the Wizard 104 and the "L1" label indicates that this particular OL corresponds to the layout that is currently on the document. The Page Manager 106 receives WIZ-L1 118 as input and applies any previously-saved author-defined changes to WIZ-L1 118 to produce an OL known as "PM-L1" 120. These previously-saved author-defined changes are also referred to as "overrides" because they indicate author-defined content that automatically replaced Wizard-defined content of WIZ-L1 118. The "PM-L1" nomenclature is particularly useful because the "PM" label indicates that this particular OL was rendered by the Page Manager 106 and the "L1" label indicates that this particular OL corresponds to the layout that is currently on the document.

It should be understood that the layout defined by WIZ-L1 118 is not passed to the editor 108 for presentation to the author. This is because WIZ-L1 118 is a generic document produced by the Wizard 104. Rather, PM-L1 120, the content-filled document rendered by the Page Manager 106, is passed to the editor 108 for presentation to the author. There is, of course, an exception for the first version of the document. In this case, there are no previously-saved author-defined changes to apply to WIZ-L1, so WIZ-L1 becomes PM-L1, which is passed to the editor 108 for presentation to the author. The author may then make additional changes 112 to PM-L1 120 to create the "current publication" or "PUB-L1" 114. That is, the author begins with PM-L1 120 and adds the author's changes 112 to create PUB-L1 114, the current publication.

After the author has added content to the current publication (PUB-L1 114), the author may return to the menu-driven utility 102 and enter a new set of author's selections 122 to define a new layout for the document. The scenario that corresponds to a new layout is known as the "destination scenario" 124. The Wizard-produced layout corresponding to the destination scenario is known as the "destination layout," or "WIZ-L2" 126, as shown on FIG. 1C. The "WIZ-L2" nomenclature is particularly useful because the "WIZ" label indicates that this particular OL (i.e., the destination layout) was rendered by the Wizard 104 and the "L2" label indicates that this particular OL corresponds to the layout for the new publication. That is, the Page Manager 106 receives WIZ-L2 126 as input and applies overrides (i.e., previously-saved author defined changes) to WIZ-L2 126 to produce an OL known as "PM-L2" 128.

The "PM-L2" nomenclature is particularly useful because the "PM" label indicates that this particular OL was rendered by the Page Manager 106 and the "L2" label indicates that this particular OL corresponds to the layout for the new publication. PM-L2 128, which is also referred to as the "new publication," is then passed to the editor 108 for presentation to the author. At this point, the destination scenario 124 is saved as the controlling scenario 116, the new publication (PM-L2 128) is saved as the current publication (PUB-L1 114), the Wizard-produced destination layout (WIZ-L2 126) is saved as the Wizard-produced source layout (WIZ-L1 118), and the Page Manager-produced destination layout (PM-L2 128) is saved as the Page Manager-produced source layout (PM-L1 120) for future reference. In other words, the Page Manager 106 resets the new publication (PM-L2 128) as the current publication 114 so that the author may make continue working on the document.

In the context of the nomenclature defined above, the basic problem solved by the Page Manager 106 is, given WIZ-L1, PM-L1, PUB-L1, and WIZ-L2, identify and apply overrides to produce PM-L2 in a manner that will be helpful to the author of the document. That is, add the author-defined content of PUB-L1 to WIZ-L2 in a manner that most likely reflects what the author of the document wants. In fact, the Page Manager 106 may be asked to add the author-defined content of PUB-L1 to any number of layouts for the same publication, which are referred to as L1, L2 . . . Ln.

The process of creating PM-L2 from PM-L1, PUB-L1, and WIZ-L2 is known as "morphing." To enable morphing, the publisher program 100 defines the following logical and arithmetic functions for operation with the OPLs and OLs:

(1) "ChangeToNewLayout"—this function, which directly or indirectly calls the other functions, accepts any four OLs and morphs the first three OLs to the fourth OL. For example, this function morphs the current publication (PUB-L1 114), the Page Manager-produced source layout (PM-L1 120), and the Wizard-produced destination layout (WIZ-L2 126) to the new publication (PM-L2 128). Specifically, this morph involves computing author-defined changes (i.e., overrides) by comparing the current publication (PUB-L1 114) to the Page Manager-produced source layout (PM-L1 120) and applying the overrides to the Wizard-produced destination layout (WIZ-L2 126) to create the new publication (PM-L2 128);

(2) "LookForUserChanges"—this function, which directly or indirectly calls LookForFormattingChanges and LookForPositionChanges, accepts any two OLs and detects and stores objects that are different in the second OL with respect to the first OPL. For example, given a source layout (WIZ-L1 118) and the current publication (PUB-L1 114), LookForUserChanges detects the differences and stores them in another OL;

(3) "LookForFormattingChanges"—this function accepts any two OLs and detects and stores format-related object properties that are different in the second OL with respect to the first OL. For example, given the source layout (WIZ-L1 118) and the current publication (PUB-L1 114), LookForFormattingChanges detects the format-related differences and stores them in the another OL;

(4) "LookForPositionChanges"—this function accepts any two OLs and detects and stores position-related object properties that are different in the second OL with respect to the first OL. For example, given the source layout (WIZ-L1 118) and the current publication (PUB-L1 114), LookForPositionChanges detects the position-related differences and stores them in another OL;

(5) "ClassifyUserCreatedObjects"—this function, which directly or indirectly calls ClassifyOneObject, accepts an OL and assigns names to unnamed objects that appear in the OL. For example, given the current publication (PUB-L1 114), ClassifyUserCreatedObjects names the author-created objects that appear in the current publication (PUB-L1 114);

(6) "ClassifyOneObject"—this function accepts an unnamed object in an OL and assigns a name to the object. For example, given the current publication (PUB-L1 114), ClassifyOneObject names one particular author-created object that appears in the current publication (PUB-L1 114);

(7) "AddNeededPages"—this function accepts an OL and a page list and adds pages to the OL for any pages that are in the page list but are not in the OL. For example, this function accepts the current publication (PM-L1 114) and a page list for the Wizard-produced destination layout (WIZ-L2 126) and adds pages to the current publication (PM-L1 114) for any pages that are in the page list for the Wizard-produced destination layout (WIZ-L2 126) but are not in the current publication (PM-L1 114);

(8) "RemoveObject"—this function accepts an OL and an object name, and deletes the named object from the OL;

(9) "AddObject"—this function accepts an OL and an object, and adds the object to the OL;

(10) "ModifyObject"—this function accepts a source object and a destination object that have the same and modifies the content of the source object to match the content of the destination object;

(11) "RemoveUnneededPages"—this function accepts any OL, such as the new publication (PM-L2 128), and deletes any pages that include no subject matter;

(12) "ApplyObjectFormatting"—this function accepts any two OLs, such as the destination layout (WIZ-L2 126) and the current publication (PUB-L1 114), and applies the formatting changes of the second OL the current publication (PUB-L1 114) to the first OL the destination layout (WIZ-L2 126);

(13) "ApplyObjectPosition"—this function accepts any two objects that have the same name and modifies the formatting and position of the second object to correspond to the formatting and position of the first object (the content of the second object is typically not altered by this function);

(14) "GetPageList"—this function accepts an OL, such as the destination layout (WIZ-L2 126), and returns a page list that is sorted by the order the pages should appear in the document; and

(15) "StorePropertyDifferences"—this function accepts any two objects and stores the property differences in another OL. For example, given and object having the same name in the source layout (WIZ-L1 118) and the current publication (PUB-L1 114), StorePropertyDifferences stores the object's property differences in a data file.

Armed with the preceding tools, the Page Manager 106 is well equipped to handle the following tasks, which occur frequently in the operation of the Page Manager 106.

Basic Morphing Arithmetic

When the Wizard 104 creates a layout, it stores the scenario 116 along with the source OL (WIZ-L1 118) for the layout. As noted previously, this scenario is referred to as the controlling scenario 116 because it corresponds to the layout of the current publication (PUB-L1 114). Thus, the publisher program 100 obtains the source OL (WIZ-L1 118), which is the object list for the source layout, simply by giving the Wizard 104 the controlling scenario 116 and asking it for a corresponding object list. The Wizard 104 creates the source OL (WIZ-L1 118) directly from the controlling scenario 116. At this point, because the author has not yet made any changes to the source layout (WIZ-L1 118), the current publication (PUB-L1 114) is the same as the source layout (WIZ-L1 118). That is, the source OL returned by the Wizard 104 exactly matches the current publication.

Now, the author may use the editor 108 to make and save author-defined changes 112 to the current publication (PUB-L1 114). For example, the author may add a table of contents to the current publication (PUB-L1 114) even though the source layout (WIZ-L1 118) did not include one. If the controlling scenario 116 includes a menu item associated with the table of contents, the publisher program 100 may create the destination scenario 124 directly from the controlling scenario 116 (i.e., by changing "table of contents =no" to "table of contents=yes"). So in this case, the publisher program 100 can obtain the destination OL (WIZ-L2 126) for the new publication (PM-L2 128) by giving the Wizard 104 the destination scenario 124 and asking the Wizard 104 for the destination layout (WIZ-L2 126).

To perform this basic morph, the Page Manager 106 computes the differences between the source OL (WIZ-L1 118) and the destination OL. (WIZ-L2 126) to create the new publication (PM-L2 128). The basic morph algorithm is as follows: (1) Give the controlling scenario 116 to the Wizard 104 to obtain the source OL (WIZ-L1 118); (2) Give the destination scenario 124 to the Wizard 104 to obtain the destination OL (WIZ-L2 126); (3) Step through both OLs 118, 126 at the same time, in order of object name, and modify the current publication (PUB-L1 114) to create the new publication (PM-L2 128). If an object appears in the source OL (WIZ-L1 118) but not in the destination OL (WIZ-L2 126), remove the object from the new publication (PM-L2 128). If an object appears in the destination OL (WIZ-L2 126) but not the source OL (WIZ-L1 118), add the object to the new publication (PM-L2 128). If an object appears in both the source OL (WIZ-L1 118) and the destination OL (WIZ-L2 126) but has different properties, then modify the object in the new publication (PM-L2 128) to have the properties of the object in the destination OL (WIZ-L2 126); and (4) store the new publication (PM-L2 128) as the current publication and store the destination scenario as the controlling scenario.

It should be understood that, if the source OL (WIZ-L1 118) is an empty object list, the preceding algorithm may be used to create the first layout for a new document. In this case, the Wizard 104 accepts a null scenario as the source layout (WIZ-L1 118) so that the destination scenario 124 ends up being the controlling scenario for the publication. Notice also that the Wizard 10 , simply turns scenarios into layouts. It doesn't know how those layouts will be used, nor does it care. All the Wizard 104 does is accept a scenario and return a layout. Every time the Wizard 104 is given a particular scenario, it returns the identical layout.

Multi-Page Layouts

The preceding basic morphing algorithm can be extended to publications containing more than one page. Very few changes are required to deal with objects that exist on more than one page, and to add or remove pages as needed. First, the Page Manager 106 needs a way to distinguish between pages—a way to identify a particular page. Because the author may insert a page anywhere in a document, a page number is not sufficient. This is because changing a page number changes the numbers of all of the pages behind the renumbered page. To solve this problem, the Page Manager 106 assigns each page a unique name, just like each objects is assigned a unique name.

Because an author-created object does not initially have a page to live on, the Page Manager 106 must somehow assign a page to the author-created object. The Page Manager 106 does this by adding the name of the page to the position OL for the object. Thus, the Page Manager 106 specifies a page name in the position OL of every object.

In addition, the ChangeToNewLayout function handles adding and removing pages as needed. The Page Manager 106 adds any needed pages before the main body of the ChangeToNewLayout function, so that an object expecting to live on new a page has a page to live on. Conversely, unneeded pages are removed after the main body of the ChangeToNewLayout function. More specifically, the Page Manager 106 obtains a list of pages for the new publication (PM-L2 128) by calling the GetPageList function, which returns a, page list that is sorted by the order in which the pages should appear in the publication.

The AddNeededPages function steps through the page list page by page, in order. If the page list for the Wizard-produced destination layout (WIZ-L2 126) includes a page that does not exist in the current publication (PUB-L1 114), the Page Manager 106 adds a blank page to the new publication (PM-L2, 128) and gives it the correct name. At the end of the ChangeToNewLayout function, the Remove-UnneededPages function removes pages that are in the new publication (PM-L2 128) but that do not include any subject matter.

Unused Objects

The Wizard 104 may create an object that is later deleted by the PageManager 106. For example, the author may ask for a first layout that includes a table of contents and later ask for a second layout that does not include the table of contents. In response, the Page Manager 106 must remove the table of contents object from the current publication (PUB-L1 114). But the Page Manager 106 should never simply delete an object that contains author-defined content. If the table of contents was simply deleted, the author-defined content would not be available if the author later added the table of contents back into the publication. For example, the author-defined content in the table of contents would be lost if the author started in a layout with a table of contents, switched to a layout without a table of contents, and then switched back to the original layout. Deleting the author-defined content under these circumstances would be quite annoying.

To handle this situation, the Page Manager 106 saves all unused objects that contain author-defined content in a list of unused objects, which is sorted by object name. Because all objects in the current publication (PUB-L1 114) have unique names, the Page Manager 106 can always distinguish between objects. Handling unused objects in this manner requires certain modifications to the AddObject function and the RemoveObject function. Specifically, every time the Page Manager 106 removes an object, the Page Manager 106 checks whether the removed object contains author-defined content. If removed object does contain author-defined content, then the removed object is saved in a list of unused objects. In addition, every time the Page Manager 106 adds an object, the Page Manager 106 checks whether an object with the same name has been previously stored in the list of unused objects. If there is an object in the list of unused objects with the same name as the added object, the Page Manager 106 retrieves the stored object instead of creating a new object from scratch. This way, the added object contains the content the author added to the removed object before it was stored in the unused object list.

Tracking Author Changes

As noted previously, the publisher program 100 allows the author to return to the menu-driven layout selection utility 102 any number of times to define new layouts for the same content-filled document. Each time, the Wizard 104 translates the author's selections 110 into a generic document conforming to the new layout and the Page Manager 106 adds the previously-saved author-defined changes to the generic document. This includes author-defined changes that do not have corresponding menu items in the menu-driven utility 102. For example, the author may add a picture frame to the current publication. Since the menu-driven layout utility 102 does not include a menu item associated with the picture frame, the publisher program 100 cannot obtain the OL for the current publication (PUB-L1 114) directly from the Wizard 104.

In this case, the editor 108 adds the table of contents (author's changes 112) to the source OL (PM-L1 120) to create the OL for the current publication (PUB-L1 114), which is now different than the source OL (WIZ-L1 118) originally created by the Wizard 104. Now, the author may return to the menu-driven utility 102, define a destination scenario 124, and ask the Wizard 104 to produce a destination layout (WIZ-L2 126). The Page Manager 106 then morphs the current publication (PUB-L1 114) to the new publication (PM-L2 128) by adjusting the destination layout (WIZ-L2 126) for previously-saved author-defined changes (overrides) and then applying the destination layout (WIZ-L2 126) as adjusted for overrides to the current publication (PUB-L1 114), which results in the new publication (PM-L2 128).

Because the author has changed the source layout (WIZ-L1 118), it does not match the current publication (PUB-L1 114) when ChangeToNewLayout is called. Thus, the Page Manager 106 must determine how to reflect these author-defined changes in the new publication (PM-L2 128). Typically, the author-defined change is simply applied to the new publication (PM-L2 128). For example, if the author changed the title of the publication to black in a previous layout, the Page Manager 106 should not change it back to red just because the destination layout includes a red title (unless the destination is a black-and-white layout—this situation is discussed below under the heading "similar scenario sets").

There are several classes of changes that the author can make to a Wizard-created publication: formatting changes, position changes, content changes, deleting objects, and adding objects. Each type of author-defined change is briefly detailed below.

Formatting Changes

The author may change an object's formatting, for example by changing an object's font or color, or adding a border. The Page Manager 106 keeps track of every formatting change made by the author. This is accomplish by calling the LookForUserChanges function from the ChangeToNewLayout function to run before the main loop of the ChangeToNewLayout function.

The LookForUserChanges function performs a pass over the source OL (WIZ-L1 118), looking for differences between the source OL (WIZ-L1 118) and the current publication (PUB-L1 114). Generally, if the source OL (WIZ-L1 118) matches the current publication (PUB-L1 114) for a particular object, then the author has not changed that object. Thus, by comparing the source OL, (WIZ-L1 118) to the current publication (PUB-L1 114) object-by-object, Page Manager 106 can identify the author-defined changes 112, since any differences between the source OL (WIZ-L1 118) and the current publication (PUB-L1 114) can generally be attributed to the author-defined changes 112.

But the Page Manager 106 cannot rely entirely on a comparison between the source OL (WIZ-L1 118) and the current publication OL (PUB-L1 114) to identify the author-defined changes 112. This is because the Page Manager 106 applies overrides to the source OL (WIZ-L1 118) that can mask certain author-defined changes. FIG. 1C illustrates an example of this situation, in which the author has changed the title of a previous layout to black. The Page Manager 106 therefore includes an override 150 for the title (T=black) from the previous layout. The author now morphs to a new layout L1 that includes a red title. The Wizard 104 produces a source layout (WIZ-L1 118) with a red title. The Page Manager 106 then applies the override 150 to the source layout (WIZ-L1 118) to produce PM-L1 120 with a black title, which is passed to the editor 108 for further manipulation by the author. The author then changes (author-defined change 112) the title to red in the current publication (PUB-L1 114).

The author now returns to the menu-driven utility 102 and defines a destination scenario 124 that includes a green title and the Wizard 104 produces a destination layout (WIZ-L2 126) with a green title. If the Page Manager 106 only compared the source layout (WIZ-L1 118) to the current publication (PUB-L1 114), it would conclude that the author had not changed the color of the title because the title is red in both the source layout (WIZ-L1 118) and the current publication (PUB-L1 114). The Page Manager 106 would therefore miss the title override and leave the title to green in the new publication (PM-L2 128). To avoid this problem, the Page Manager 106 compares the Page Manager-rendered source layout (PM-L1 120) to the current publication (PUB-L1 114). This comparison reveals that the author did, in fact, change the title to red, and the Page Manager 106 applies the appropriate override 152 (T=red) in the new publication (PM-L2 128).

More specifically, LookForUserChanges detects author-defined format changes (such as a line's color, the font used for a text frame, or the fill color of an ellipse) by calling the LookForFormattingChanges function. The LookForFormattingChanges function compares each object's formatting definition in the current publication (PUB-L1 114) to the object's formatting definition in the Page Manager-rendered source layout (PM-L1 120). If there are any differences, an OL containing the differences is stored as an override the object.

Once the Page Manager 106 has stored the formatting overrides, they can be applied to the destination layout (WIZ-L2 126) to render the new publication (PM-L2 128). Because the author may select any number of different layouts or scenario sets for a publication, the Page Manager 106 may maintain separate formatting overrides for each layout or scenario set. The Page Manager 106 may therefore store separate formatting overrides for each layout or scenario set defined by the author so that the Page Manager 106 maintains a record of exactly what the author has changed in each layout or scenario set. The StorePropertyDifferences function, which stores author-defined changes on a per-object basis, performs this operation.

Position Changes

The LookForPositionChanges function works in a similar way, but it is a bit more complicated. An object's position is divides into three components: size, location, and angle. The LookForPositionChanges function has a similar structure to the LookForFormattingChanges function in that it detects author-defined changes by comparing each object's position in the Page Manager-rendered source layout (PM-L1 120) to the object's position in the current publication (PUB-L1 114). But, unlike formatting changes, position changes are not always applied to the destination layout (WIZ-L2 126) to render the new publication (PM-L2 128). This is because some position changes would alter the destination layout (WIZ-L2 126) so drastically that the resulting new publication (PM-L2 128) would probably not be what the author of the document intended. Therefore, the basic rule of preserving author-defined changes is not always applied with respect to position changes.

For example, consider a four-column source layout (WIZ-L1 118) in which the masthead extends across the entire front page, and a two-column destination layout (WIZ-L2 126) in which the masthead only extend across one column—the left-hand column, which occupies the left half of the front page. If the an author's change 112 to the current publication (PUB-L1 114) altered the masthead to only extend across the left half of the front page, should the length of the masthead be cut in half again in the new publication (PM-L2 128)? Because the resulting masthead would only cover half of the left-hand column of the new publication (PM-L2 128), this is probably not what the author wants.

The Page Manager 106 includes generalized-logic for addressing these types of questions, which often arise in the context of position changes. Specifically, the Page Manager 106 determines whether to apply a size, location, or angle override on an object-by-object basis by comparing the source layout (WIZ-L1 118) to the destination layout (WIZ-L2 126). That is, the Page Manager 106 refers to the Wizard-rendered layouts to determine whether to apply an override for a particular author-defined change. If the object at issue is sufficiently similar in both the source layout (WIZ-L1 118) and the destination layout (WIZ-L2 126), the Page Manager 106 applies the author-defined change to the new publication.

For example, the Page Manager 106 preferably applies a size override for a particular object under the following conditions: if the object in the source layout (WIZ-L1 118) has the same proportions, within a certain tolerance, as the corresponding object in the destination layout (WIZ-L2 126); or if the object in the source layout (WIZ-L1 118) has the same size, within a certain tolerance, as the corresponding object in the destination layout (WZ-L2 126) and the object in the source layout (WIZ-L1 118) overlaps the corresponding object in the current publication (PUB-L1 114). The Page Manager 106 preferably applies a location override for a particular object it the object in the source layout (WIZ-L1 118) has the same location, within a certain tolerance, as the object in the destination layout (WIZ-L2 126). And the Page Manager 106 preferably applies an angle override for a particular object if the object in the source layout (WIZ-L1 118) has the same angle, within a certain tolerance, as the object in the destination layout (WIZ-L2 126).

The amount of the tolerance for the size, location, and angle overrides may be set by the program developers, or they may adjustable by individual authors. In particular, it is anticipated that more sophisticated authors may find the ability to adjust the tolerances advantageous. In fact, the tolerance for the size, location, and angle overrides may be separately adjustable, and may be adjustable on a per-document basis. In addition, a default tolerance, such in the range of 80–90% may be selected by the program developers. It should also be appreciated that the criteria for determining whether to apply size, location, and angle overrides described above is just one example. Many different criteria may be developed and applied in connection with the present invention.

The Page Manager 106 applies the author-defined changes (overrides) to the new publication (PM-L2 128) by calling the ApplyObjectFormatting and ApplyObjectPosition functions. Moreover, the ApplyObjectFormatting and ApplyObjectPosition functions may choose from multiple overrides for each object in the publication, one override corresponding to each layout or group of layouts that treat the object similarly. For example, if the author changes the position of an object in a first layout to place the object on the left side of the page, and for a second layout to place the object on the top of the page, the Page Manager 106 may apply a separate position override for each layout.

More specifically, the Page Manager 106 applies the size, location, and angle overrides to the destination layout (WIZ-L2 126) to render the new publication (PM-L2 128). Because the author may select any number of different layouts or scenario sets for a publication, the Page Manager 106 may maintain separate size, location, and angle overrides for each layout or scenario set. In addition, the Page Manager 106 may stores separate size, location, and angle overrides for each object that has been changed by the author so that the Page Manager 106 maintains a record of exactly what the author has changed in each layout. The StorePropertyDifferences function, which stores author-defined changes on a per-object basis, performs this operation.

Author-Deleted Objects

The author may also delete an object that the Wizard 104 created, such as a decorative line that the author really doesn't like. Once the author deletes an object, the Page Manager 106 never creates that object again, since that would likely annoy the author. To handle this, the Page Manager 106 stores a list of the names of all objects that the author has deleted. The AddObject function checks the list of deleted objects and never creates an object that the author has previously deleted. In addition, ModifyObject function never tries to modify an object that has been deleted.

Author Content Changes

Several types of frames include content: text frames, OLE frames, and picture frames. The Wizard 104 typically fills in some sort of default content, such as gibberish, for every frame, and leaves it is up to the author to replace the default content with author-defined content. The Page Manager 106 never overwrites author-defined content with gibberish, as this most definitely is not what the author usually wants. Indeed, one of the most important advantages of the Page Manager 106 is to allow the author of a content-filled document to the change the layout of the document without having to reenter the content. The Page Manager 106 therefore flags every object that includes any author-defined content. This is accomplished by adding a flag to every frame called "Sample Content," which can be either "true" or "false." Whenever the Wizard 104 creates a frame, it sets the Sample Content flag for that frame to "true." Whenever the author changes the content of a frame, editor 108 sets the Sample Content flag for that frame to "false." The Page Manager 106 never overwrites the content of a frame if the Sample Content flag for that frame is set to "false."

Author-Created Objects

The final class of author changes is author-created objects. Although the Wizard 104 gives the author an initial set of objects in the source layout, the author may want to create new objects. The Page Manager 106 is configured to handle these new objects intelligently. For example, the author may replace an object created by the Wizard 104 with a new object. The Page Manager 106 detects the author-created object and treats it with a higher priority that the objects created by the Wizard 104. That is, the Page Manager 106 always resolves conflicts between author-created objects and Wizard-created objects in favor of the author-created objects.

In addition, the Page Manager 106 names author-created objects by calling the ClassifyUserCreatedObjects function from ChangeToNewLayout. The ClassifyUserCreatedObjects function steps through all of the unnamed objects on the page. The Page Manager 106 detects whether an author-created object occupies the same location, within a certain tolerance, as an object that the author deleted. If so, the Page Manager 106 gives the author-created object the same name as the deleted object. To do so, the ClassifyUserCreatedObjects function compares the position of the author-created object against the position of every author-deleted object. If they match within a certain tolerance, the Page Manager 106 assigns the author-created object the name of the deleted object and removes the deleted object from the list of deleted objects. Alternatively, user-created objects may be associated with Wizard-created objects using criteria similar to that described previously for position overrides.

The ClassifyOneObject function compares a single object to all of the objects in the list of deleted objects. This function computes a closeness score, which indicates how closely the object matches each of the deleted objects. The higher the closeness score, the closer the match. If any object has a high enough score (i.e., above a threshold closeness score), it is considered to be a match and is given the name of the deleted object. If more than one deleted object matches, the object with the highest score wins. The winning object is removed from the list of deleted objects. The value of the threshold closeness score is not fixed and can be adjusted depending on preferences.

Alternatively, ClassifyOneObject may score an author-created object against all Wizard-created objects in the current scenario. The object that receives the highest score, which is also higher than the threshold score, becomes an "associated" object for that author-created object. An author-created object that is associated with a Wizard-created object is treated the same as the Wizard-created object. An author-created object can be associated with any Wizard-created object, whether that object is in the publication or deleted. When an association exists, the spatial relationship between the Wizard-created object and the associated object is preserved across a morph. Thus, if the author moves a Wizard-created object to a new location, then all associated objects are automatically moved to the same relative location. For author-created objects that are associated with a deleted Wizard-created object, the spatial change that would have been applied to the Wizard-created object is applied to the associated objects just as though the Wizard-created object had not been deleted. But formatting changes are preferably not applied to associated objects.

Similar Scenario Sets

The Page Manager 106 also addresses situations in which author-defined changes should not be applied to a new publication. For example, if the author moves a first story in a newsletter and then chooses another layout that includes a different story in the same position as the first story, the publication will end up a mess—the first story will be on top of the second story. Or, if the author changes the color of an object to red and then chooses another layout that is completely black and white, the author probably does not want to keep that object red.

Handling these situations involves the concept of sets of similar layouts. Basically, the scenario set for the Wizard 104 is partitioned into subsets of similar scenarios. The amount of similarity is not fixed and can be adjusted depending on preferences. When the author changes from one layout to another in the same subset, the Page Manager 106 applies the author's changes to the new publication. And when the author changes from one layout to another in the different subset, the Page Manager 106 does not apply the author's changes to the new publication. If the author then morphs back to a scenario in the first subset, the Page Manager 106 reapplies the author's changes to the new publication.

Similar scenario subset logic may be implemented by adding scenario subset logic to the formatting and position overrides. Without scenario subset logic, formatting and position overrides are mapped from an object name to the OL for the current publication (PUB-L1 114). Similar scenario subset logic may be implemented by changing these overrides to map from a tuple (object name, layout subset identifier) to the OL for the current publication (PUB-L1 114). In this case, the Page Manager 106 stores a different set of overrides for each scenario subset.

The Page Manager 106 does not explicitly define scenario subsets. Rather, the Wizard 104 may decide how to partition the layouts into subsets because only the Wizard 104 includes the information necessary to determine which layouts are similar. Several modifications allow the Page Manager 106 to handle a Wizard that defines scenario subsets. First, the formatting and position override lists are mappings from object tuples (name, scenario subset ID) the OL for the current publication (PUB-L1 114), as noted above. The Page Manager 106 obtains the scenario subset ID from the Wizard 104 along with the source layout source layout (WIZ-L1 118).

Second, the LookForUserChanges function passes the scenario subset ID to the LookForPositionChanges and LookForFormattingChanges functions. These functions use the scenario subset ID when accessing the formatting and position overrides. Third, the AddObject and ModifyObject functions accept the destination scenario subset ID, and pass the destination scenario subset ID down to the ApplyObjectFormatting and ApplyObjectPosition functions. These functions use the destination scenario subset ID when applying the formatting and position changes.

In addition, the scenario subset logic may be further enabled by allowing for a different partitioning of the scenario sets for formatting and position overrides. This may be beneficial because a significant formatting change to a layout is not always associated with a significant position change. For example, two layouts might have all of their objects in the same positions, but apply different formatting the all of the objects. Moreover, the Wizard 104 may partition the scenario sets differently for each object. This may be beneficial in a situation in which two layouts are identical for part of the document, but different for another part. For example, two layouts for a newsletter might have the masthead, table of contents, and sidebar all in the same place, but all of the stories are different. In this case, the Wizard 104 may assign scenario set IDs on a per-object basis.

Logic Flow Diagrams

All of the preceding aspects of the publisher program 100 are brought together into a cooperating set of object-oriented OL functions that allow the author of a document to use the menu-driven utility 102 and the Wizard 104 to automatically change the layout of a content-filled document. The operation of the publisher program 100 is described below with reference to FIGS. 2–19. Throughout this description, reference will be made to the nomenclature introduced with reference to FIGS. 1B–C.

Figure 2:
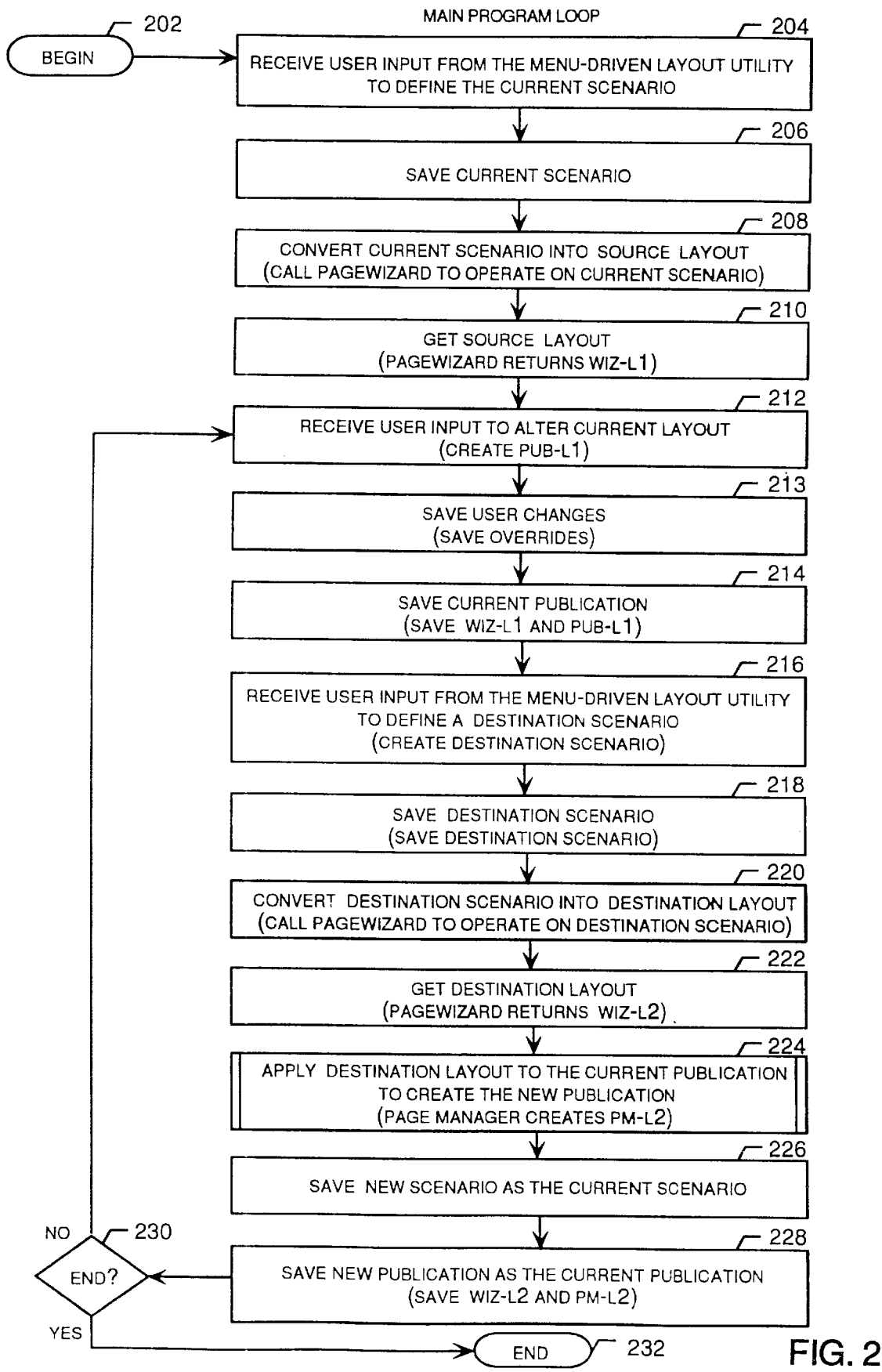
FIG. 2 is a logic flow diagram illustrating the main program loop for a publisher program according to an exemplary embodiment of the present invention.

FIG. 2 is a logic flow diagram illustrating the main program loop for the publisher program 100. The main program loop begins in step 202, and in step 204 the publisher program 100 receives the author's selections 110 at the menu-driven utility 102. The author's selections 110 define a layout for the document that the author wants to create. In step 204, the menu-driven utility 102 translates the author's selections 110 into an OPL known as the controlling scenario 116, which is saved for future reference. In step 206, the controlling scenario 116 is provided to the Wizard 104, and in step 210, the Wizard 104 returns the source layout (WIZ-L1 118), which is an OL. The Wizard-rendered source layout (WIZ-L1 118) is a generic document that conforms to the layout defined by the controlling scenario 116.

Because this is the first version of the document, the Page Manager 106 only performs trivial operations at this point, so that the Page Manager-rendered source layout (PM-L1 120) is the same as the Wizard-rendered source layout (WIZ-L1 118). In step 212, the source layout (PM-L1 120) is passed to the editor 108, which receives the author's changes 122 that add author-defined content to the source layout (PM-L1 120) to create the current publication (PUB-L1 114). In step 213, the editor 108 saves the author's changes as a plurality of OPLs defining each object's formatting and position. In step 214, the editor 108 saves the current publication (PUB-L1 114). It should be appreciated that at this point, the current publication (PUB-L1 114) is different that the Wizard-rendered source layout (WIZ-L1 118) because the current publication (PUB-L1 114) includes the author's changes 122 that add author-defined content to the source layout.

In step 216, the publisher program 100 receives another set of author's selections 122 at the menu-driven utility 102. The author's selections 122 define a destination layout into which the author wants to morph the current publication (PUB-L1 114). In step 218, the menu-driven utility 102 translates the author's selections 122 into an OPL known as the destination scenario 124, which is saved for future reference. In step 220, the controlling scenario 124 is provided to the Wizard 104, and in step 222 the Wizard 104 returns the destination layout (WIZ-L2 126). The Wizard-rendered destination layout (WIZ-L1 126) is a generic document that conforms to the layout defined by the destination scenario 124.

Because this is not the first version of the document, the Page Manager 106 operates on the destination layout (WIZ-L2 126) before the document is passed to the editor 108 for presentation to the author. In routine 224, the Page Manager 106 applies the Wizard-produced destination layout (WIZ-L2 126), as adjusted for author-defined changes, to the current publication (PUB-L1 114) to produce the new publication (PM-L2 128). That is, the Page Manager 106 morphs the current publication (PUB-L1 114) to the new publication (PM-L2 128) so that the new publication (PM-L2 128) is a content-filled document conforming the destination layout (WIZ-L2 126).

In step 228, the destination scenario 124 is saved as the controlling scenario 116, the new publication (PM-L2 128) is saved as the current publication (PUB-L1 114), the Wizard-produced destination layout (WIZ-L2, 126) is saved as the Wizard-produced source layout (WIZ-L1 118), and the Page Manager-produced destination layout (PM-L2 128) is saved as the Page Manager-produced source layout (PM-L1 120) for future reference. In other words, the Page Manager 106 resets the new publication (PM-L2 128) as the current publication 114 so that the main program loop may now operate on the new publication (PM-L2 128).

Accordingly, in step 230, the publisher program 100 determines whether an "END" command has been received. If an "END" command has been received, the "YES" branch is followed to the END step 232, and the main program loop is discontinued. If an "END" command has not been received, the "NO" branch loops to step 212, and the main program loop continues so that the current publication (PUB-L1 114) is then passed to the editor 108, which receives additional changes 112 from the author to further define the current publication (PUB-L1 114). Thus, the author may return to the menu-driven utility 102 any number of times to define different layouts (L1, L2 . . . Ln) for the document.

Figure 3:
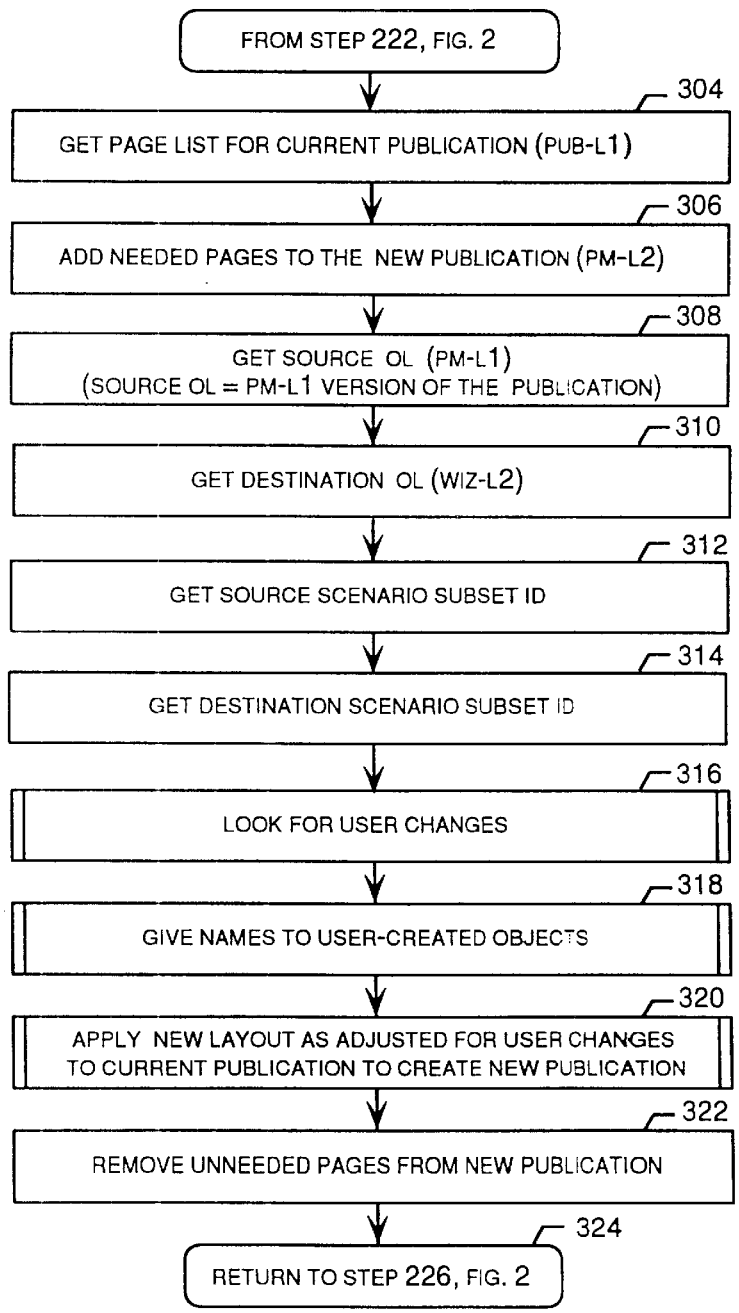
FIG. 3 is a logic flow diagram illustrating a routine for applying author-defined changes to a new layout in the publisher program shown in FIG. 2.

FIG. 3 is a logic flow diagram illustrating the routine 224 for applying the Wizard-produced destination layout (WIZ-L2 126), as adjusted for author-defined changes, to the current publication (PUB-L1 114) to produce the new publication (PM-L2 128). Routine 224 follows step 222 shown on FIG. 2. The Page Manager 106 begins to create the news publication (PM-L2 128) by setting the new publication (PM-L2 128) to be the same as the current publication (PUB-L1 114). The Wizard-produced destination layout (WIZ-L2 126) is then adjusted for author-defined overrides and applied to new publication (PM-L2 128). That is, the new publication (PM-L2 128) is; produced by applying the destination layout (WIZ-L2 126), as adjusted for author-defined overrides, to a copy of the current publication (PUB-L1 114). It should be understood, therefore, that the modifications described below with respect to the new publication (PM-L2 128) are, in fact, applied to a copy of the current publication (PM-L1 114) to the new publication (PM-L2 128).

In step 304, the Page Manager 106 gets a page list for the current publication (PM-L1 114). Specifically, the Page Manager 106 calls the GetPageList function to operate on the current publication (PM-L1 114). In step 306, the Page Manager 106 adds any needed pages to the new publication (PM-L2 128). Specifically, the Page Manager 106 calls the AddNeededPages function to operate on the current publication page list and the new publication (PM-L2 128). This ensures that every object in the current publication (PM-L1 114) has a page to live on in the new publication (PM-L2 128).

The Page Manager 106 then gets the Page Manager-created source layout (PM-L1 120) in step 308 and the destination layout (WIZ-L2 126) in step 310. If the Wizard 104 defines similar scenario sets, the Page Manager 106 gets the source scenario subset ID in step 312 and the destination scenario subset ID in step 314. At this point, the Page Manager 106 may determine whether the source scenario subset ID corresponds to the destination scenario subset ID. Typically, the Page Manager 106 does not add any author-defined changes to the new publication (PM-L2 128) if the source scenario subset ID and the destination scenario subset ID do not correspond in a predefined manner. More sophisticated scenario subset logic may also be implemented, as described above under the heading "Similar Scenario Sets."

Step 314 is followed by routine 316, in which the Page Manager 106 looks for author-defined changes in the current publication (PUB-L1 114). Routine 316 is described in detail with reference to FIG. 4. In routine 318, the Page Manager 106 gives names to author-created objects in the current publication (PUB-L1 114). Routine 318 is described in detail with reference to FIG. 7. In routine 320, the Page Manager 106 applies the Wizard-produced destination layout (WIZ-L2 126), as adjusted for author-defined changes, to the current publication (PUB-L1 114) to produce the new publication (PM-L2 128). Routine 320 is described in detail with reference to FIG. 9. In step 322, the Page Manager 106 removed any unneeded pages from the new publication (PM-L2 128). Specifically, the Page Manager 106 calls the RemoveUnneededPages function to operate on the new publication (PM-L2 128). Step 322, is followed by the "RETURN" step 324, which returns to the main program loop at step 226 on FIG. 2.

Figure 4:
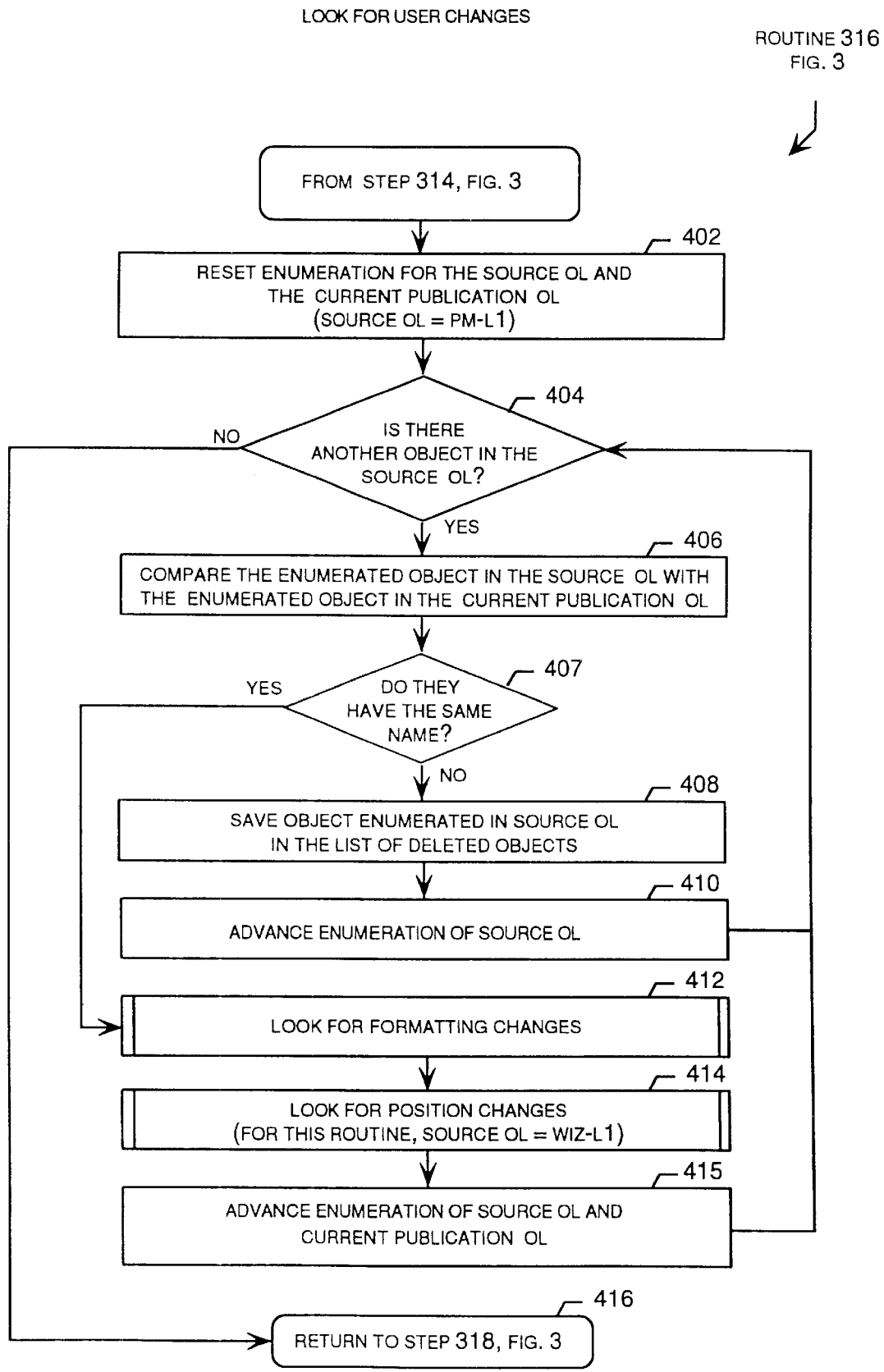
FIG. 4 is a logic flow diagram illustrating a routine for looking for author-defined changes in the publisher program shown in FIG. 2.

FIG. 4 is a logic flow diagram illustrating routine 316 for looking for author-defined changes in the current publication (PUB-L1 114). Routine 316 follows step 314 shown on FIG. 3. In step 402, the Page Manager 106 resets the enumeration for the source OL (PM-L1 120) and the current publication OL (PUB-L1 114). In step 404, the Page Manager 106 determines whether there is an object in the source OL (PM-L1 120). If there is not an object in the source OL (PM-L1 120), the "NO" branch is followed to the "RETURN" step 416, which exits routine 316.

If there is an object in the source OL (PM-L1 120) the "YES" branch is followed from step 404 to step 406, in which the Page Manager 106 compares the enumerated object in the source OL (PM-L1 120) with the enumerated object in the current publication OL (PUB-L1 114). In step 407, the Page Manager 106 determines whether the enumerated object in the source OL (PM-L1 120) has the same name as the enumerated object in the current publication OL (PUB-L1 114). In other words, the Page Manager 106 determines whether the enumerated object in the source OL (PM-L1 120) exists in the current publication OL (PUB-L1 114). If the enumerated object in the source OL (PM-L1 120) does not have the same name as the enumerated object in the current publication OL (PUB-L1 114), the "NO" branch is followed from step 407 to step 408. The fact that the enumerated object in the source OL (PM-L1 120) does not have a corresponding object in the current publication OL (PUB-L1 114) indicates that the author deleted the enumerated object from the current publication OL (PUB-L1 114). Therefore, in step 408, the Page Manager 106 saves the enumerated object in the source OL (PM-L1 120) in the list of deleted objects. In step 410, the Page Manager 106 advances the enumeration of the source OL (PM-L1 120). From step 410, routine 316 loops to step 404, in which the Page Manager 106 performs a comparison for the newly-enumerated object in the source OL (PM-L1 120).

Referring again to step 407, if the enumerated object in the source OL (PM-L1 120) does have the same name as the enumerated object in the current publication OL (PUB-L1 114), the "YES" branch is followed to routine 412, in which the Page Manager 106 looks for formatting changes in the enumerated object in the source OL (PM-L1 120) by comparing the object in the current publication OL (PUB-L1 114) to the corresponding object in the source layout (PM-L1 120). Routine 412 is described in detail with respect to FIG. 5. In routine 414, the Page Manager 106 looks for position changes in the enumerated object. Routine 414 is described in detail with respect to FIG. 6. In the disclosed embodiment, to reduce the complexity of routine 414, position overrides are determined by comparing the current publication OL (PUB-L1 114) to the Wizard-produced source layout (WIZ-L1 118) rather than the Page Manager-produced source layout (PM-L1 120).

Routine 414 is followed by step 415, in which the Page Manager 106 advances the source OL (PM-L1 120) and the current publication OL (PUB-L1 114). From step 410, routine 316 loops to step 404, in which the Page Manager 106 performs a comparison for the newly-enumerated objects in the source OL (PM-L1 120) and the current publication OL (PUB-L1 114). Thus, the Page Manager 106 loops through routine 316 until all the objects in the source OL (PM-L1 120) have been compared to the objects in the current publication OL (PUB-L1 114).

Figure 5:
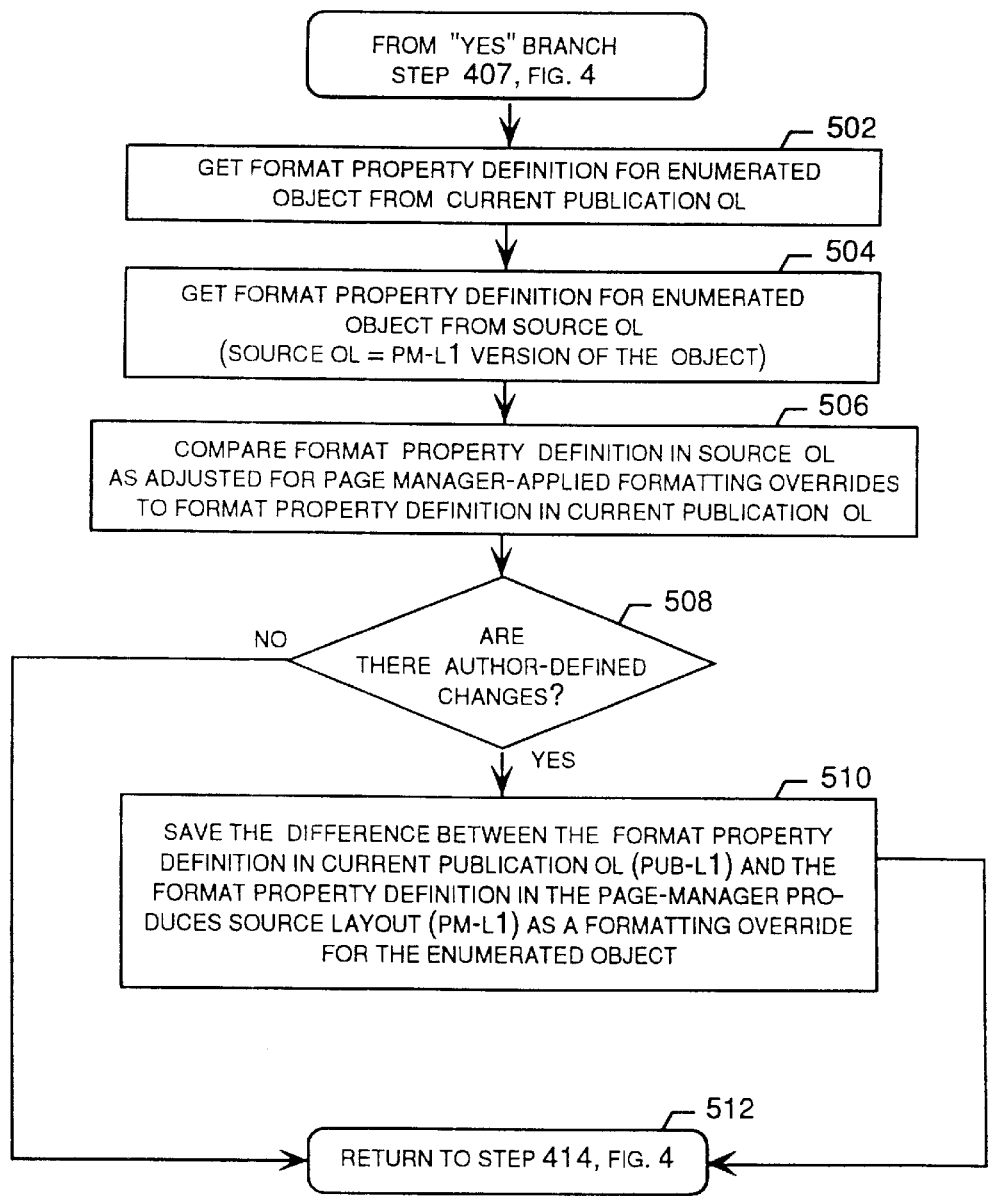
FIG. 5 is a logic flow diagram illustrating a routine for looking for author-defined formatting changes in the publisher program shown in FIG. 2.

FIG. 5 is a logic flow diagram illustrating routine 412 for looking for formatting changes in the object enumerated in the source OL (PM-L1 120) and the current publication OL (PUB-L1 114). Routine 412 follows the "YES" branch from step 407 shown on FIG. 4. In step 502, the Page Manager 106 gets the format property definition for the matching object in the current publication OL (PUB-L1 114). In step 504, the Page Manager 106 gets the format property definition for the enumerated object in the source OL (PM-L1 120). As discussed previously under the heading "Formatting Changes," the Page Manager 106 uses the Page Manager-produced property definition (i.e., the property definition in PM-L1 120) rather than the Wizard-produced property definition (i.e., the property definition in WIZ-L1 118) as the source OL to avoid missing any author-defined changes that could be masked by Page Manager-applied changes.

In step 506, the Page Manager 106 compares the format property definition for the enumerated object in the source OL (PM-L1 120) to the format property definition for the enumerated object in the current publication OL (PUB-L1 114). In step 508, the Page Manager 106 determines whether there are additional user changes to the format property definition for the enumerated object. That is, the Page Manager 106 determines whether there are any differences between the format property definition for enumerated object in the source OL (PM-L1 120) and the format property definition for the enumerated object in the current publication OL (PUB-L1 114). Any such differences are attributable to author-defined changes 112 applied to the Wizard-produced source OL (WIZ-L1 118) to the Page Manager-produced source OL (PM-L1 120).

If there are not author-defined formatting changes 112 for the enumerated object, the "NO" branch is followed to the "RETURN" step 512, which exits routine 412 and returns to step 414 shown on FIG. 4. If there are author-defined changes 112 for the enumerated object, the "YES" branch is followed from step 508 to step 510, in which the Page Manager 106 stores the author-defined change as a formatting override for the enumerated object. That is, the difference between format property definition from the current publication (PUB-L1 114) and the format property definition from the Page Manager-produced source OL (PM-L1 120) for the enumerated object is stored as a formatting override for the enumerated object. Specifically, the Page Manager 106 appends the new override to the set of existing overrides or starts a new set of overrides if there is not an existing set of overrides. Step 510 is followed by the "RETURN" step 512, which exits routine 412 and returns to step 414 shown on FIG. 4.

Figure 6:
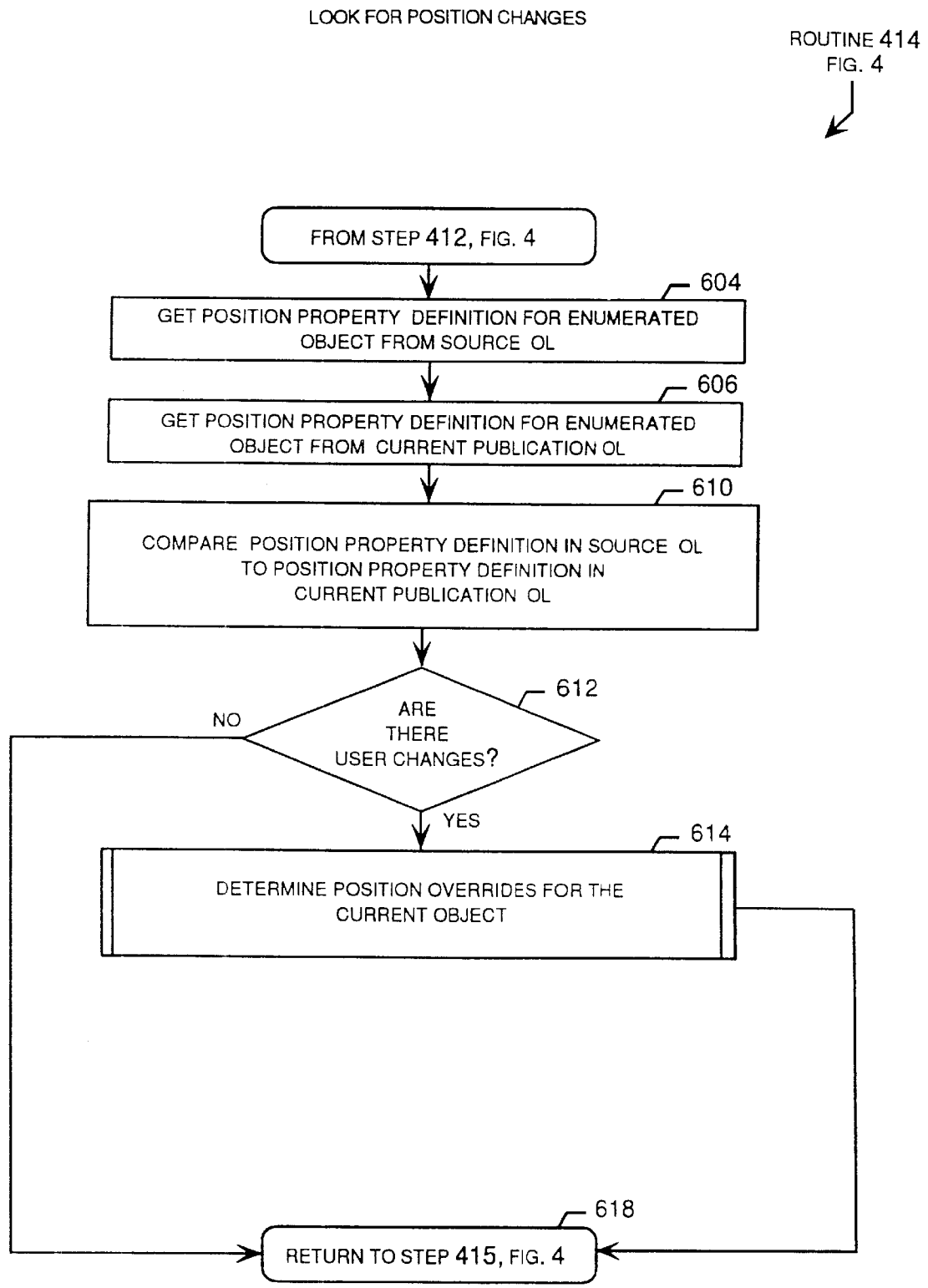
FIG. 6 is a logic flow diagram illustrating a routine for looking for author-defined position changes in the publisher program shown in FIG. 2.

FIG. 6 is a logic flow diagram illustrating routine 414 for looking for position changes in the object enumerated in the source OL (WIZ-L1 118) and the current publication OL (PUB-L1 114). Routine 414, which follows routine 412 shown on FIG. 4, corresponds to the LookForUserChanges function. In step 604, the Page Manager 106 gets the position property definition for the enumerated object in the source OL (WIZ-L1 118). In step 606, the Page Manager 106 gets the position property definition for the enumerated object in the current publication OL (PUB-L1 114). In step 610, the Page Manager 106 compares the position property definition for the enumerated object in the source OL (WIZ-L1 118) to the position property definition for the enumerated object in the current publication OL (PUB-L1 114).

In step 612, the Page Manager 106 determines whether there arts additional user changes to the position property definition for the enumerated object. That is, the Page Manager 106 determines whether there are any differences between the position property definition for the enumerated object in the Page Manager-produced source OL (WIZ-L1 118) and the position property definition for the enumerated object in the current publication OL (PUB-L1 114). Any such differences are attributable to author-defined changes 112.

If there are not author-defined position changes 112 for the enumerated object, the "NO" branch is followed from step 612 to the "RETURN" step 618, which exits routine 414 and returns to step 415 shown on FIG. 4. If there are author-defined changes 112 for the enumerated object, the "YES" branch is followed from step 612 to routine 614, in which the Page Manager 106 determines whether to store the author-defined change as a position, size and/or angle override for the enumerated object. The logic of routine 614 for determining whether to store a position override is described with reference to FIG. 13. Routine 614 is followed by the "RETURN" step 618, which exits routine 414 and returns to step 415 shown on FIG. 4.

Figure 7:
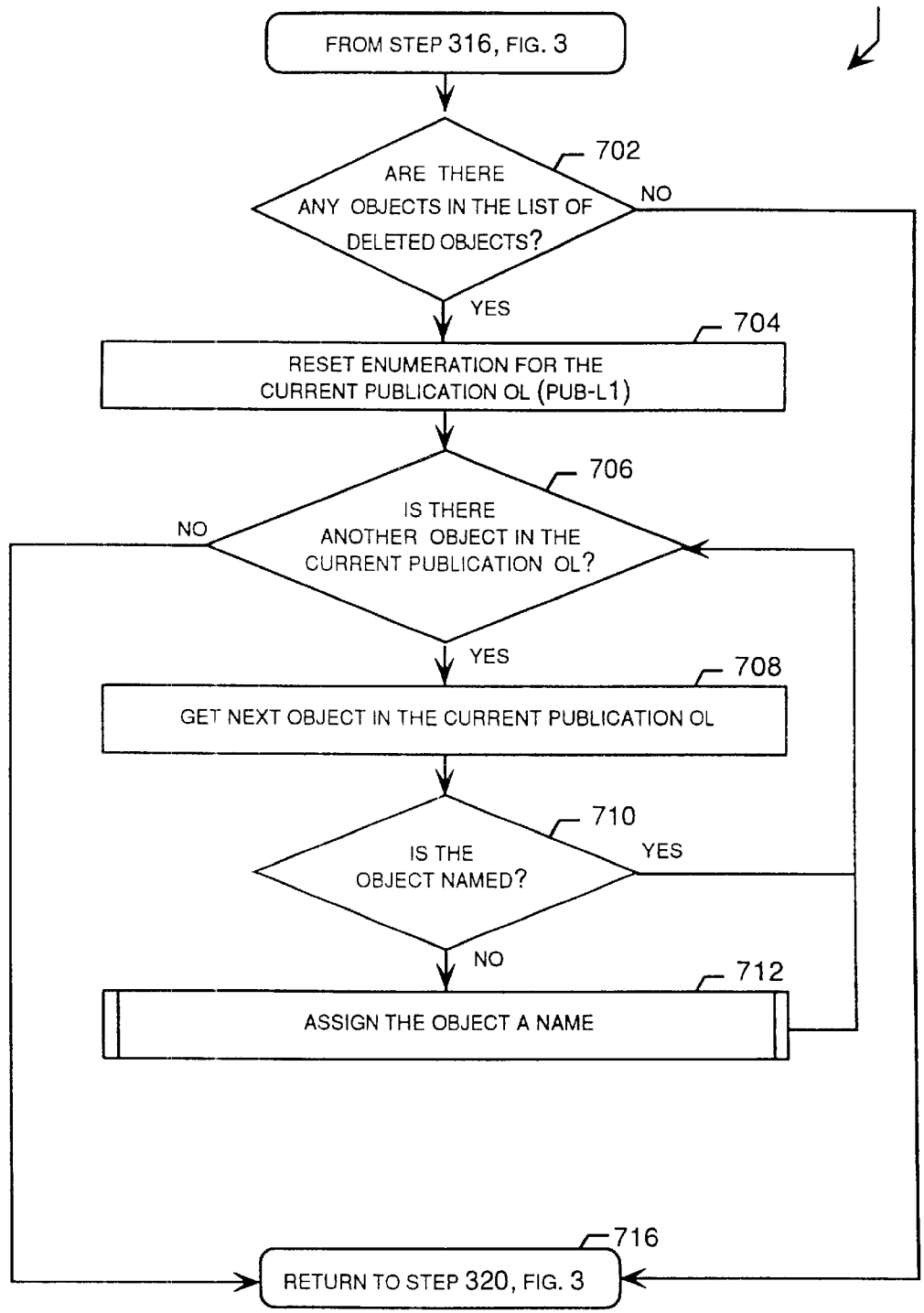
FIG. 7 is a logic flow diagram illustrating a routine for assigning names author-defined objects in the publisher program shown in FIG. 2.

FIG. 7 is a logic flow diagram illustrating routine 318 for assigning names to author-defined objects in the current publication (PUB-L1 114). Routine 318, which follows routine 316 shown on FIG. 3, corresponds to the Classify-UserCreatedObjects function. In step 702, the Page Manager 106 determines whether there are any objects in the list of deleted objects. Recall that in step 408, the Page Manager 106 added to the in the list of deleted objects all objects that appeared in the source OL (PM-L1 120) did not have a corresponding object in the current publication OL (PUB-L1 114), which indicated that the author had deleted a Wizard-produced object from the Wizard-produced source OL (WIZ-L1 118). If there are no objects in the list of deleted objects, the "NO" branch is followed to the "RETURN" step 716, which exits routine 318 and returns to step 320 shown on FIG. 3.

If there are objects in the list of deleted objects, the "YES" branch is followed from step 702 to the step 704, in which the Page Manager 106 resets the enumeration for the current publication OL (PUB-L1 114). In step 706, the Page Manager 106 determines whether there is another object in the current publication OL (PUB-L1 114). If there is not another object in the current publication OL, the "NO" branch is followed to the "RETURN" step 716, which exits routine 318 and returns to step 320 shown on FIG. 3. If there is another object in the current publication OL, the "YES" branch is followed to step 708, in which the Page Manager 106 gets the next object in the current publication OL (PUB-L1 114). In step 710, the Page Manager 106 determines whether this object has a name. If the object does have a name, the "YES" branch loops to step 706. If the object does not have a name, the "NO" branch is followed to routine 712, in which the Page Manager 106 assign the object a name. Routine 712 is described in detail with reference to FIG. 8. Thus, the Page Manager 106 loops thorough routine 318 until each unnamed object in the current publication OL (PUB-L1 114) has been assigned a name.

Figure 8:
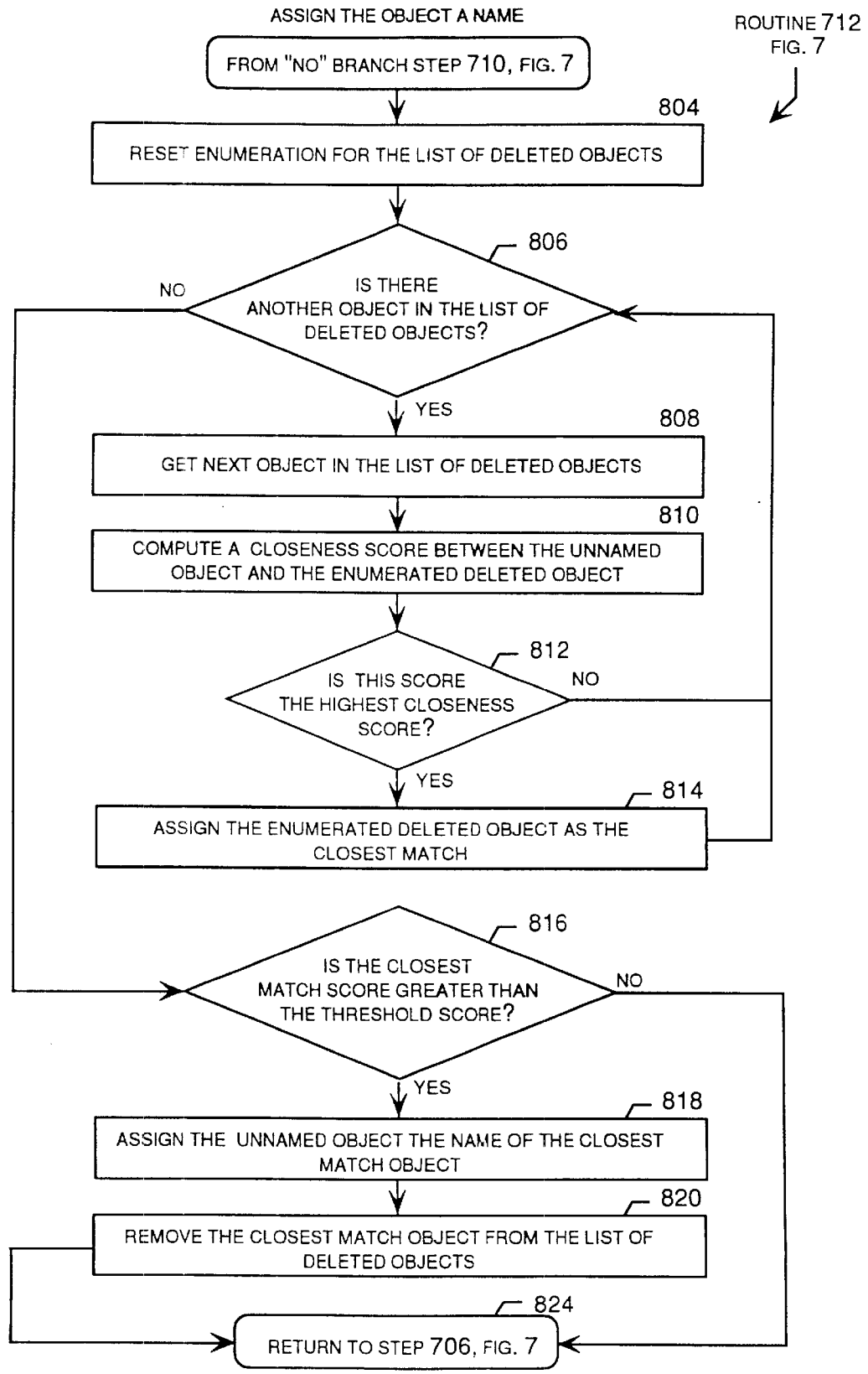
FIG. 8 is a logic flow diagram illustrating a routine for assigning a name to a particular author-defined object in the publisher program shown in FIG. 2.

FIG. 8 is a logic flow diagram illustrating routine 712 for assigning a name to a particular author-defined object. Routine 712, which follows the "NO" branch from step 710 shown on FIG. 7, corresponds to the ClassifyOneObject function. In step 804, the Page Manager 106 resets the enumeration for the list of deleted objects. In step 806, the Page Manager 106 determines whether there is another object in the list of deleted objects. If there is another object in the list of deleted objects, the "YES" branch is followed to step 808, in which the Page Manager 106 gets the next object in the list of deleted objects. In step 810, the Page Manager 106 computes a closeness score between the unnamed object and the enumerated deleted object. In step 812, the Page Manager 106 determines whether this closeness score is the highest closeness score so far. If the closeness score is not the highest closeness score so far, the "NO" branch loops back to step 806. If the closeness score is the highest closeness score so far, the "YES" branch is to step 814, it which the Page Manager 106 assigns the enumerated deleted object as the closest match. After step 814, routine 712 loops back to step 806. Thus, routine 712 loops through steps 806–814 until each object in the list of deleted objects has been compared to the unnamed object and the closest match has been identified.

Referring again to step 806, if there is not another object in the list of deleted objects, the "NO" branch is followed to step 816, in which the Page Manager 106 determines whether the closeness score for the closest match object is greater than a threshold score. The closeness score and the threshold score were described previously under the heading "Author-Created Objects." If the closeness score for the closest match object is greater than the threshold score, the "YES" branch is followed to step 818, in which the Page Manager 106 assigns the name of the closest match object to the unnamed object. In step 820, the Page Manager 106 removes the closest match object from the list of deleted objects. Step 820 is followed by the "RETURN" step 824, which exits routine 712 and returns to step 706 shown on FIG. 7.

Referring again to step 816, if the closeness score for the closest match object is not greater than the threshold score, the "NO" branch is followed to the "RETURN" step 824, which exits routine 712 and returns to step 706 shown on FIG. 7. It should be understood that routine 712 may alternatively assign a name to an unnamed object that bears no relationship to any Wizard-created objects.

Figure 9:
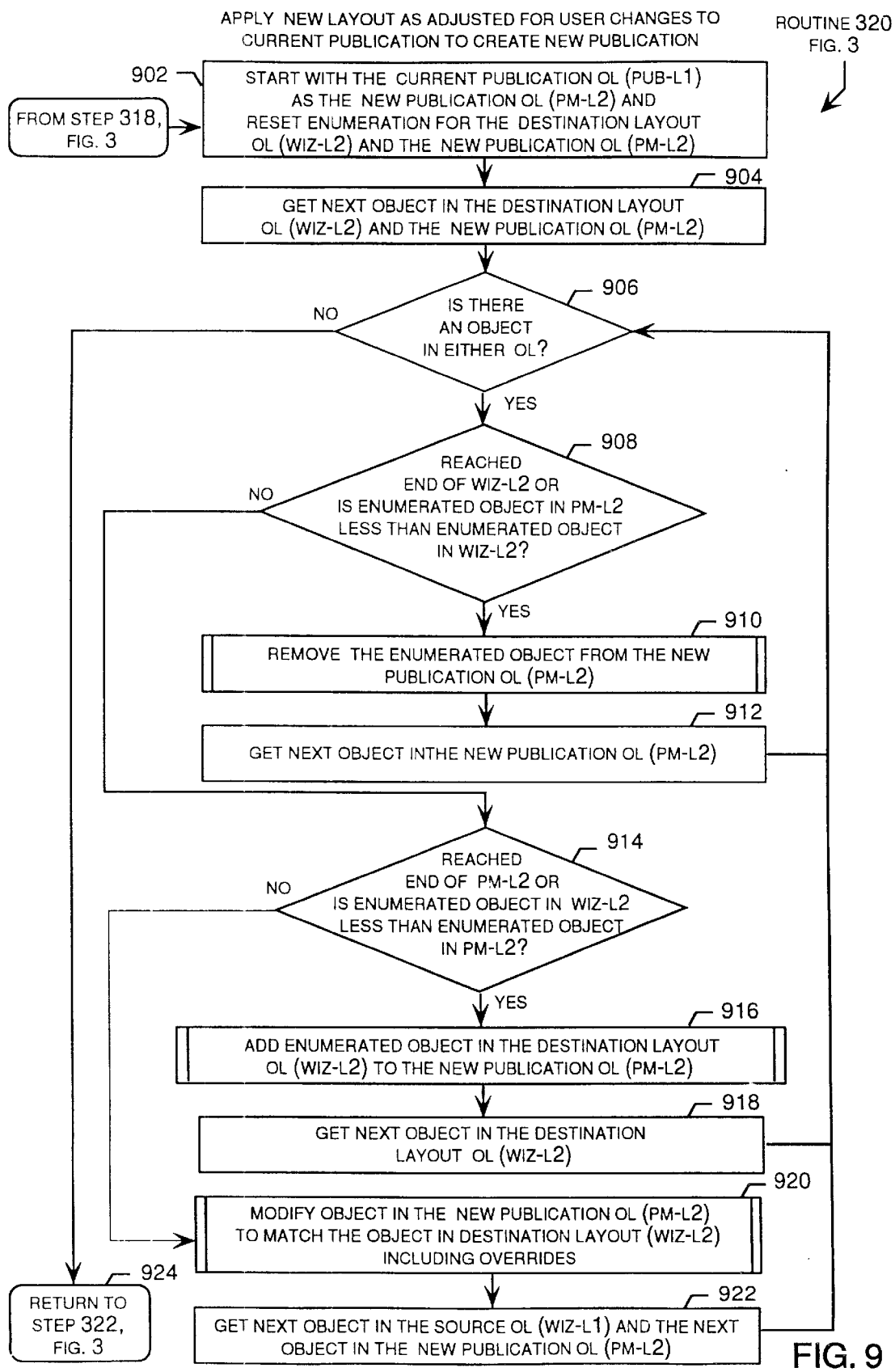
FIG. 9 is a logic flow diagram illustrating, a routine for applying author-defined changes to a destination layout (destination OL) in the publisher program shown in FIG. 2.

FIG. 9 is a logic flow diagram illustrating routine 320 for applying the Wizard-produced destination layout (WIZ-L2 126), as adjusted for author-defined changes, to the current publication (PUB-L1 114) to produce the new publication (PM-L2 128). Routine 320 follows routine 318 shown on FIG. 3. In step 902, the Page Manager 106 begins with the current publication (PUB-L1 114), which at this point may be considered to be the new publication (PM-L2 128), and resets the enumeration for the destination layout (WIZ-L2 126) and the new publication (PM-L2 128). In step 904, the Page Manager 106 gets the next object in the destination layout (WIZ-L2 126) and the new publication (PM-L2 128). In step 906, the Page Manager 106 determines whether there is another object in either the destination layout (WIZ-L2 126) or the new publication (PM-L2 128).

If there is another object in either the destination layout (WIZ-L2 126) or the new publication (PM-L2 128), the "YES" branch is followed to step 908, in which the Page Manager 106 determines whether it has reached the end of the destination layout (WIZ-L2 126) or whether the enumerated object in the new publication (PM-L2 128) has an enumeration that is less than the enumerated object in the destination layout (WIZ-L2 126). If the answer to the inquiry of step 908 is yes, this indicates that new publication (PM-L2 128) includes an object that is within the range of enumeration covered by the destination layout (WIZ-L2 126) but is not included in the destination layout (WIZ-L2 126). In this case, the "YES" branch is followed from step 908 to routine 910, in which the enumerated object is deleted from the new publication (PM-L2 128). Routine 910 is described in detail with respect to FIG. 10. Routine 910 is followed by step 912, in which the Page Manager 106 gets the next object in the new publication (PM-L2 128). From step 912, routine 320 loops back to step 906.

If the answer to the inquiry of step 908 is no, the "NO" branch is followed to step 914, in which the Page Manager 106 determines whether it has reached the end of the new publication (PM-L2 128) or whether the enumerated object in the destination layout (WIZ-L2 126) has an enumeration that is less than the enumerated object in the new publication (PM-L2 128). If the answer to the inquiry of step 914 is yes, this indicates that destination layout (WIZ-L2 126) includes an object that is not included in the new publication (PM-L2 128). In this case, the "YES" branch is followed from step 914 to routine 916, in which the object enumerated in the destination layout (WIZ-L2 126) is added to the new publication (PM-L2 128). Routine 916 is described in detail with respect to FIG. 11. Routine 916 is followed by step 918, in which the Page Manager 106 gets the next object in the destination layout (WIZ-L2 126). From step 918, routine 320 loops back to step 906.

Referring again to step 914, if the answer to the inquiry of step 914 is, no then the object enumerated in the destination layout (WIZ-L2 126) has the same name as the object that is enumerated in the new publication (PM-L2 128). In this case, the "NO" branch is followed to routine 920, in which the Page Manager 106 modifies the object enumerated in the new publication (PM-L2 128) to match the object that is enumerated in the destination layout (WIZ-L2 126) as adjusted for overrides. That is, the Page Manager 106 applies overrides to the object in the destination layout (WIZ-L2 126) and then applies the resulting object definition to the corresponding in the new publication (PM-L2 128). Routine 920 is described in detail with respect to FIG. 12.

Referring again to step 906, if there is not another object in either the destination layout (WIZ-L2 126) or the new publication (PM-L2 128), the "NO" branch is followed to the "RETURN" step 924, which exits routine 320 and returns to step 322 shown on FIG. 3.

Figure 10:
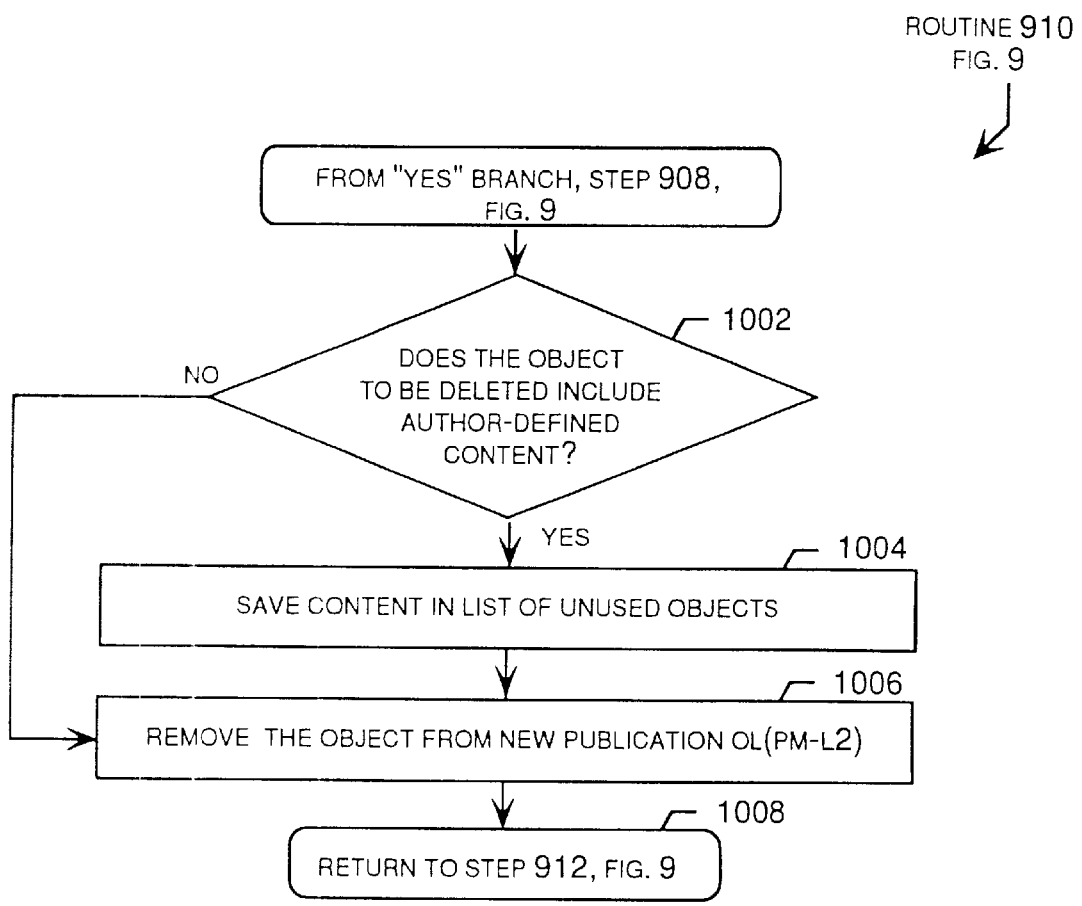
FIG. 10 is a logic flow diagram illustrating a routine for removing objects from a publication in the publisher program shown in FIG. 2.

FIG. 10 is a logic flow diagram illustrating routine 910 for removing an enumerated object from the new publication (PM-L2 128). Routine 910, which follows step 908 shown on FIG. 9, corresponds to the RemoveObject function. In step 1002, the Page Manager 106 determines whether the enumerated object (i.e., the object to be deleted from the new publication (PM-L2 128) includes author-defined content. If the enumerated object does includes author-defined content, the "YES" branch is followed to step 1004, in which the Page Manager 106 saves the enumerated object in the list of unused objects. Step 1004, as well as the "NO" branch from step 1002, are followed by step 1006, in which the Page Manager 106 deletes the enumerated object from the publication (PM-L2 128). Step 1008 is followed by the "RETURN" step, which exits routine 910 and returns to step 912 shown on FIG. 9.

Figure 11:
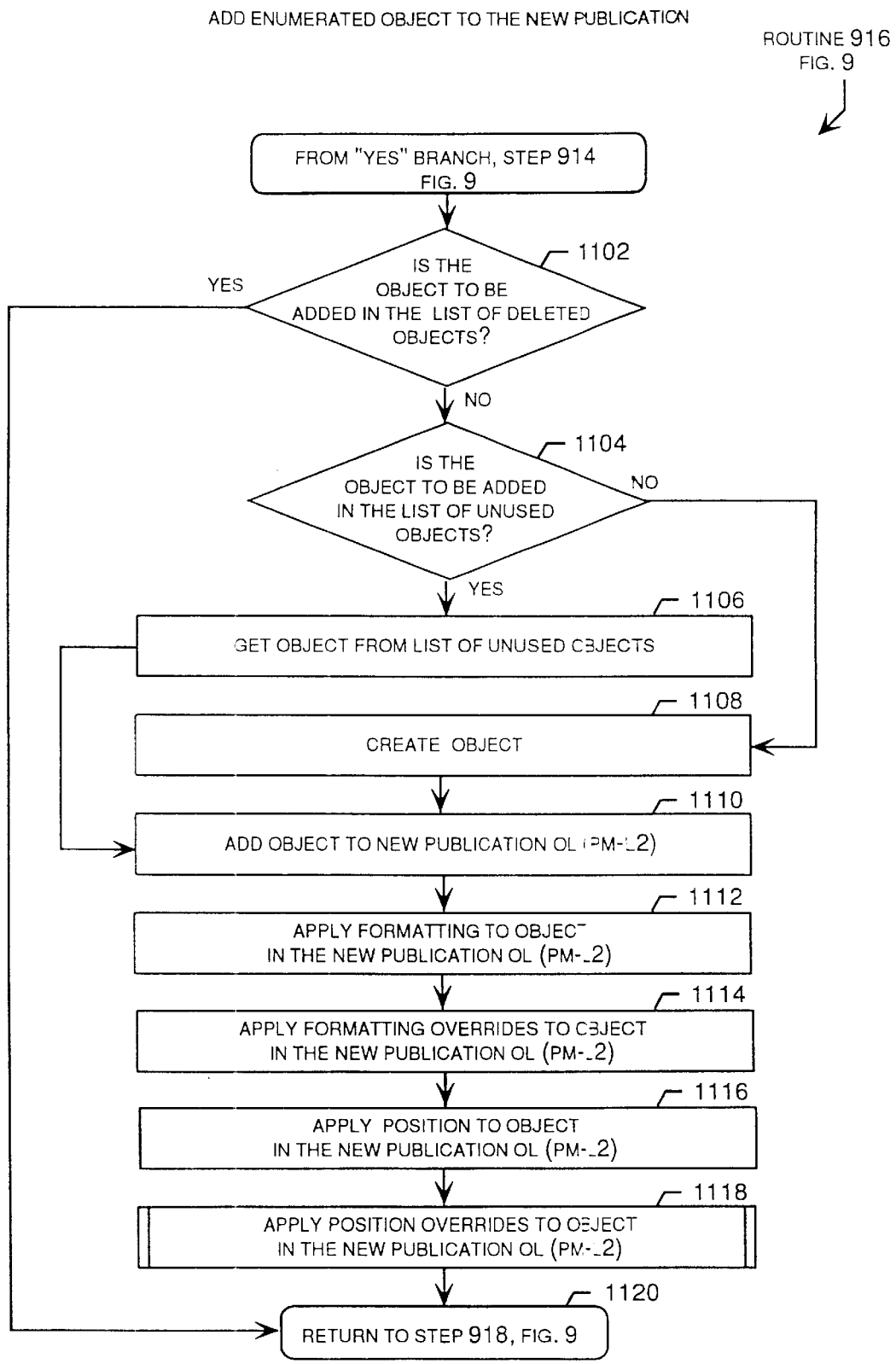
FIG. 11 is a logic flow diagram illustrating a routine for adding objects to a publication in the publisher program shown in FIG. 2.

FIG. 11 is a logic flow diagram illustrating routine 916 for adding an object enumerated in the destination layout (WIZ-L2 126) to the new publication (PM-L2 128). Routine 916, which follows step 914 shown on FIG. 9, corresponds to the AddObject function. In step 1102, the Page Manager 106 determines whether the object to be added to the new publication (PM-L2 128) is in the list of deleted objects. If the object to be added is not in the list of deleted objects, the "NO" branch is followed from step 1102 to step 1104, in which the Page Manager 106 determines whether the object to be added to the new publication (PM-L2 128) is in the list of unused objects. If the object to be added to the new publication is in the list of unused objects, the "YES" branch is followed to step 1106, in which the Page Manager 106 retrieves the object from the list of unused objects. If the object to be added to the new publication is not in the list of unused objects, the "NO" branch is followed to step 1108, in which the Page Manager 106 creates the object.

Steps 1106 and 1108 are followed by step 1110, in which the Page Manager 106 adds the object to the new publication (PM-L2 128). In step 1112, the Page Manager 106 applies the WIZ-L2 126 formatting to the added object. In step 1114, the Page Manager 106 applies formatting overrides, which were saved in step 510 shown in FIG. 5, to the added object. Specifically, the object in the Page Manager-produced source layout (PM-L1 120) is compared to the object with the same name in the current publication (PUB-L1 114). If there is a difference in the formatting for the object, the formatting for the object in the current publication (PUB-L1 114) is applied to the corresponding object (i.e. the object with the same name) in the new publication (PM-L2 128). That is, the formatting for the object from the current publication (PUB-L1 114) overrides the formatting for the object from the destination layout (WIZ-L2 126) so that formatting for the object from the destination layout (WIZ-L2 126) is not applied when the destination layout (WIZ-L2 126) is applied to the new publication (PM-L2 128).

In step 1116, the Page Manager 106 applies the WIZ-L2 126 position to the added object. In routine 1118, the Page Manager 106 applies position overrides, which were saved in routine 614 shown in FIG. 6, to the added object. Routine 614 is described in detail with respect to FIG. 13 and routine 1118 is described in detail with respect to FIG. 19. Routine 1118 is followed by the "RETURN" step 1120, which exits routine 916 and returns to step 918 shown in FIG. 9. Referring again to step 1102, if the object to be added is in the list of deleted objects, the "YES" branch is followed to the "RETURN" step 1120. This prevents the Page Manager 106 from reintroducing an object into the new publication that the author has previously deleted.

Figure 12:
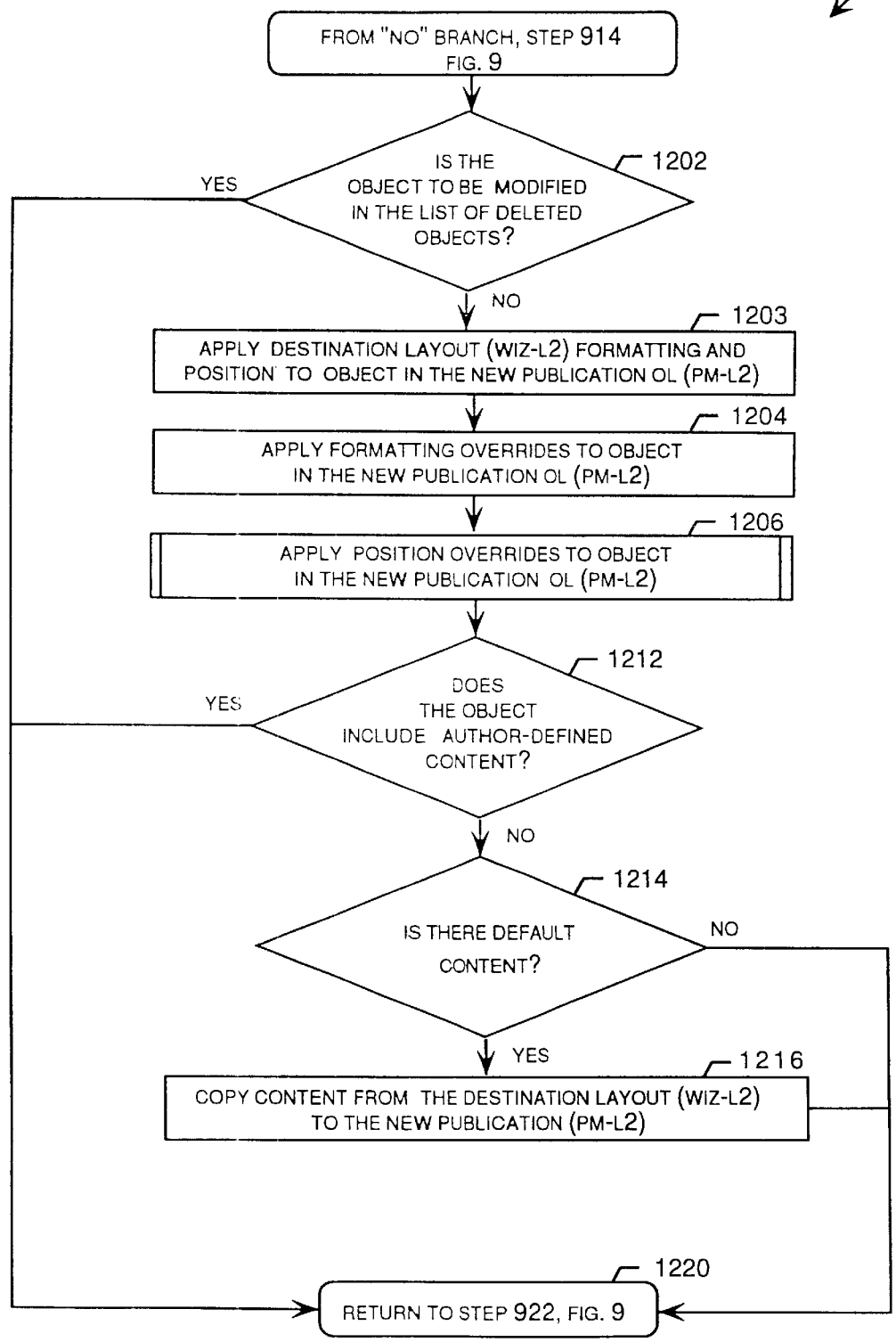
FIG. 12 is a logic flow diagram illustrating a routine for modifying objects in a publication in the publisher program shown in FIG. 2.

FIG. 12 is a logic flow diagram illustrating routine 920 for modifying an object in the new publication (PM-L2 128). Routine 920, which follows step 918 shown on FIG. 9, corresponds to the ModifyObject function. In step 1202, the Page Manager 106 determines whether the object to be modified is in the list of deleted objects. If the object to be modified is not in the list of deleted objects, the "NO" branch is followed to step 1203, in which the destination layout (WIZ-L2 126) formatting and position is applied to the object in the new publication (PM-L2 128). In step 1204, the Page Manager 106 applies formatting overrides, which were saved in step 512 shown in FIG. 5, to the object in the new publication (PM-L2 128). Specifically, the object in the Page Manager-produced source layout (PM-L1 120) is compared to the object with the same name in the current publication (PUB-L1 114). If there is; a difference in the formatting for the object, the formatting for the object in the publication (PUB-L1 114) is applied to the corresponding object (i.e. the object with the same name) in the new publication (PM-L2 128).

In routine 1206, the Page Manager 106 applies position overrides, which were saved in routine 614 shown in FIG. 6, to the added object. Routine 614 is described in detail with respect to FIG. 13 and routine 1206 (which is the same as routine 1118) is described in detail with respect to FIG. 17. Routine 1206 is followed by step 1212, in which the Page Manager 106 determines whether the object to be modified in the new publication (PM-L2 128) includes author-defined content. Specifically, the Page Manager 106 checks whether the object with the Sample Content flag for the corresponding object in the current publication (PUB-L1 114) is set to true or false. If the Sample Content flag is set to false, this indicates that the object in the current publication (PUB-L1 114) includes user-defined content.

If the object to be modified in the new publication (PM-L2 128) does not include author-defined content, the "NO" branch is followed from step 1212 to step 1214, in which the Page Manager 106 determines whether there is default content for the object. Specifically, the Page Manager 106 checks whether the corresponding object in the Page-Wizard-produced destination layout WIZ-L2 126 includes default content. If there is default content for the object, the "YES" branch is followed to step 1216, in which the Page Manager 106 copies the content from the destination layout (WIZ-L2 126) to the new publication (PM-L2 128) for the object. Step 1214, as well as the "NO" branch from step 1214, are followed by the "RETURN" step 1220, which exits routine 920 and returns to step 922 shown on FIG. 9.

Referring again to step 1212, if there is author-defined content for the object, the "YES" branch is followed to the "RETURN" step 1220, which exits routine 920 and returns to step 922 shown on FIG. 9. In addition, referring again to step 1202, if the object to be modified is in the list of deleted objects, the "YES" branch is followed to the "RETURN" step 1220. This prevents the Page Manager 106 from attempting to modify an object that has not been added to the new publication because the author has previously deleted. In other, words, the decision of step 1202 prevents the Page Manager 106 from attempting to modify an object that is not present in the new publication.

Figure 13:
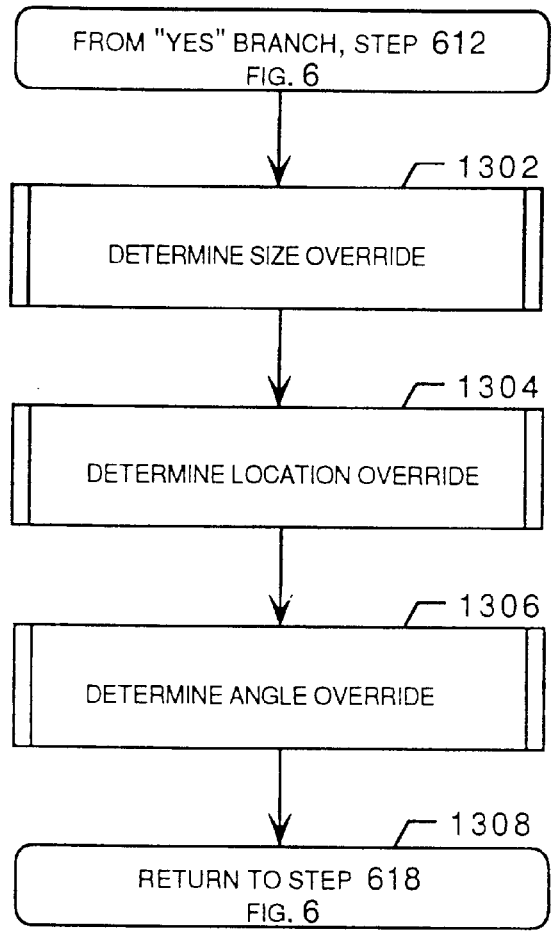
FIG. 13 is a logic flow diagram illustrating a routine for determining position overrides for a publication in the publisher program shown in FIG. 2.

FIG. 13 is a logic flow diagram illustrating routine 614 for determining position overrides. Routine 614 follows step 612 shown on FIG. 6. Recall that, unlike formatting changes, position changes are not always stored a, overrides and applied to the destination layout (WIZ-L2 126) to render the new publication (PM-L2 128). This is because some position changes would alter the destination layout (WIZ-L2 126) so drastically that the resulting new publication (PM-L2 128) would probably not be what the author of the document intended. Therefore, the Page Manager 106 determines whether to store a size, location, or angle override on an object-by-object basis.

Generally, the Page Manager 106 determines whether to store a size, location, or angle override on an object-by-object basis by comparing the source layout (WIZ-L1 118) to the destination layout (WIZ-L2 126). In routine 1302, the Page Manager 106 determines whether to store a size override. Routine 1302 is described in detail with reference to FIG. 14. In routine 1304 the Page Manager 106 determines whether to store a location override. Routine 1304 is described in detail with reference to FIG. 15. And in routine 1306 the Page Manager 106 determines whether to store an angle override. Routine 1306 is described in detail with reference to FIG. 16. Routine 1306 is followed by the "RETURN" step, which exits routine 614 and returns to step 618 shown in FIG. 6.

Figure 14:
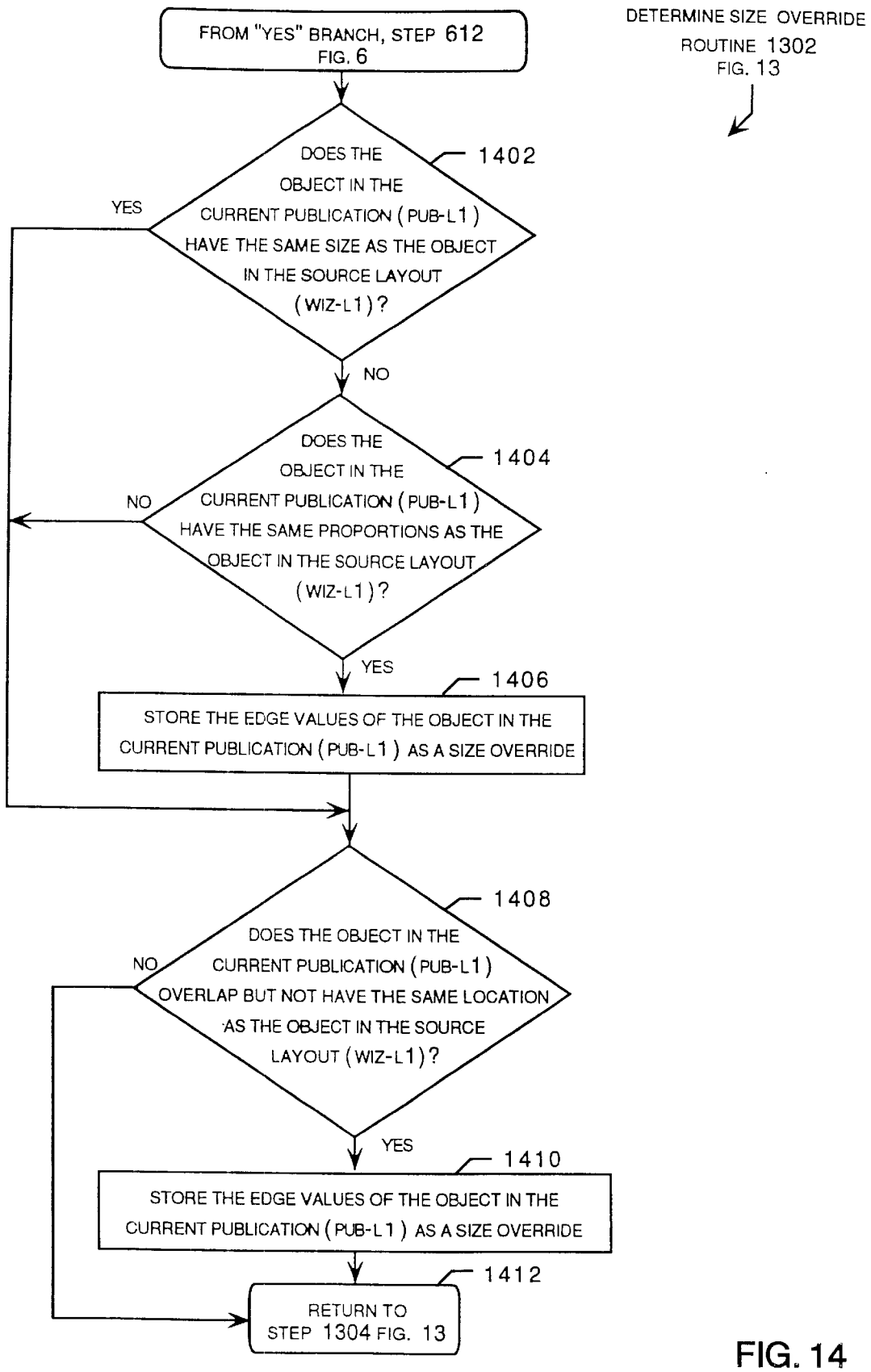
FIG. 14 is a logic flow diagram illustrating a routine for determining size overrides for a publication in the publisher program shown in FIG. 2.
Figure 17A:
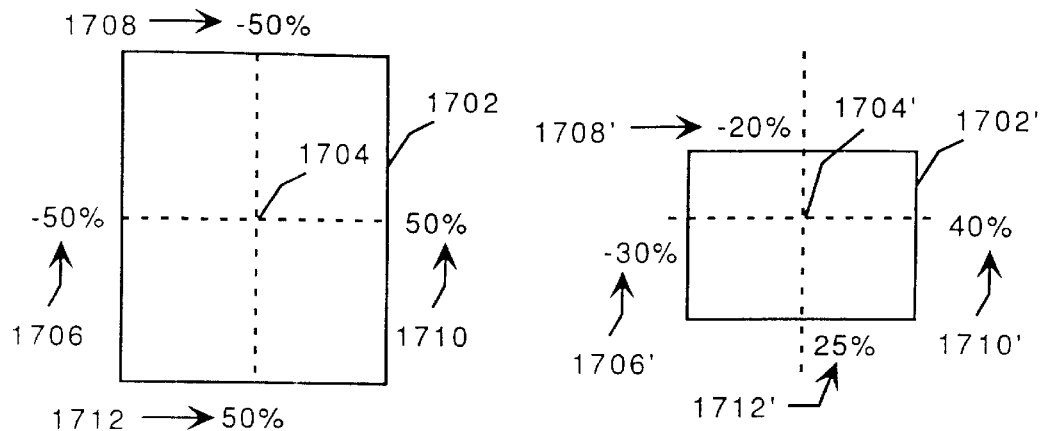
FIG. 17A is a diagram of a size override applied to an object in, accordance with the method illustrated in FIG. 14.

FIG. 14 is a logic flow diagram illustrating routine 1302 for determining a size override and FIG. 17A illustrates a size override. Routine 1302 follows step 612 shown in FIG. 6. In step 1402, the Page Manager 106 determines whether the object in the current publication (PUB-L1 114) has the same size, within a certain tolerance, as the corresponding object in the source layout (WIZ-L1 118). If the object in the destination layout does not have the same size as the corresponding object in the source layout, the "NO" branch is followed to step 1404, in which the Page Manager 106 determines whether the object in the current publication (PUB-L1 114) has the same proportions, within a certain tolerance, as the corresponding object in the source layout (WIZ-L1 118). If the object in the destination layout has the same proportions as the corresponding object in the source layout, the "YES" branch is followed to step 1406, in which the Page Manager 106 stores the size of the object in the current publication (PUB-L1 114) as a size override for the object.

The "YES" branch from step 1402, the "NO" branch from step 1410, and step 1406 are all followed by step 1408, in which the Page Manager 106 determines whether the object in the current publication (PUB-L 114) overlaps, within a certain tolerance, the object in the source layout (WIZ-L1

118). If the object in the current publication overlaps the corresponding object in the source layout, the "YES" branch is followed to step 1410, in which that Page Manager 106 stores a size override for the object. Thus, the Page. Manager 106 stores a size override for a particular object under the following conditions: if the object in the source layout (WIZ-L1 118) has the same proportions, within a certain tolerance, as the corresponding object in the destination layout (WIZ-L2 126); or if the object in the source layout (WIZ-L1 118) has the same size, within a certain tolerance, as the corresponding object in the destination layout (WIZ-L2 126) and the object in the source layout (WIZ-L1 118) overlaps, within a certain tolerance, the corresponding object in the current publication (PUB-L1 114).

Figures 18, 19:
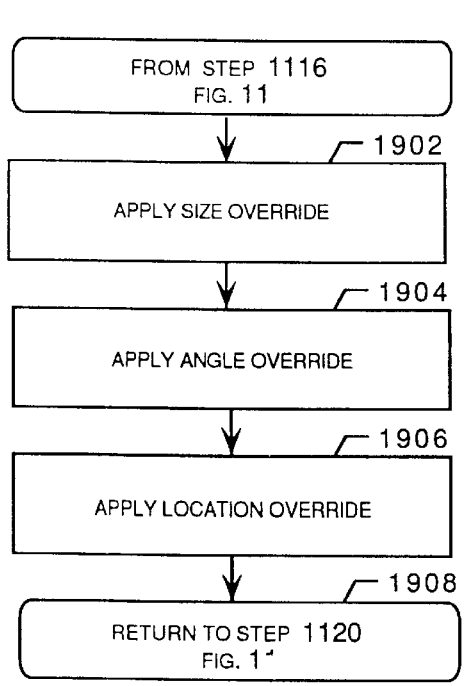
FIG. 18 is a diagram of a data structure containing position override information for a plurality of layouts.
FIG. 19 is a logic flow diagram illustrating a routine for applying position overrides to a publication in the publisher program shown in FIG. 2.

Routine 1302 shown in FIG. 14 is facilitated by the data structure illustrated in FIG. 18. As shown in FIG. 17A, every object is associated with a rectangular area 1702 within which the contents of the object is displayed. The location of the object is defined as the center 1704 of the rectangular area 1702. The location of each edge of the object is defined proportionately with respect to the center 1704. Specifically, each edge value is computed as the ratio of the distance from the center 1704 to the edge, to the distance from the edge to the opposing edge. In addition, distance from the center 1704 to the edge is assigned a sign based on its relative position to the center 1704 in a coordinate plane in which the center 1704 is the origin of the coordinate plane. For example, for the object in the Wizard-produced source layout (WIZ-L1 118), the left edge value 1706 is equal to −50%, the top edge value 1708 is equal to −50%, the right edge value 1710 is equal to 50%, and the bottom edge value 1712 is equal to 50%.

For the corresponding object in the current publication (PUB-L1 114), which may have been changed by the author, each side of the object is also defined proportionately with respect to the position of the center 1704'. The center 1704' of the object in the current publication (PUB-L1 114) is mapped to the source layout (WIZ-L1 118) so that the center 1704' is in the same location as the center 1704 of the corresponding object in the source layout. The locations of the edges of the object in the current publication (PUB-L1 114) are then defined proportionately with respect to location of the mapped center 1704'. For example, the rectangular area 1702' of the corresponding object in the current publication (PUB-L1 114) may have a left edge value 1706' equal to 30%, a top edge value 1708' equal to −20%, a right edge value 1710' equal to 40%, and a bottom edge value 1712' equal to −20%.

Because the edge values of the objects in the source layout (WIZ-L1 118) are by definition plus or minus 50%, only the edge values of the corresponding object in the current publication (PUB-L1 114) need to be stored to define a size override for the object. The data structure for storing the size overrides is shown in FIG. 18. The size override illustrated in FIG. 17A is shown in row 1802 of the data structure shown in FIG. 18, in which the edge values of the rectangle 1702' are recorded in a clockwise order beginning from the left edge: left edge value, top edge value, right edge value, and bottom edge value. That is, the size override represented by the rectangle 1702' is fully described in the data structure by the edge values 30, −20, 40, 25.

Figure 15:
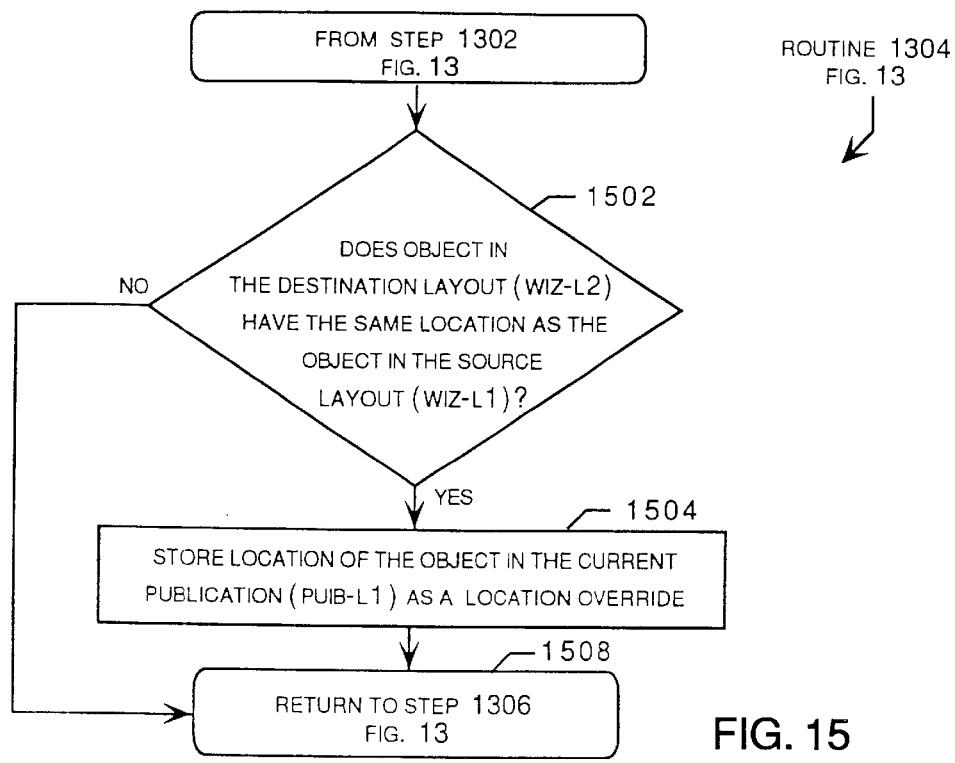
FIG. 15 is a logic flow diagram illustrating a routine for determining location overrides for a publication in the publisher program shown in FIG. 2.
Figure 17B:
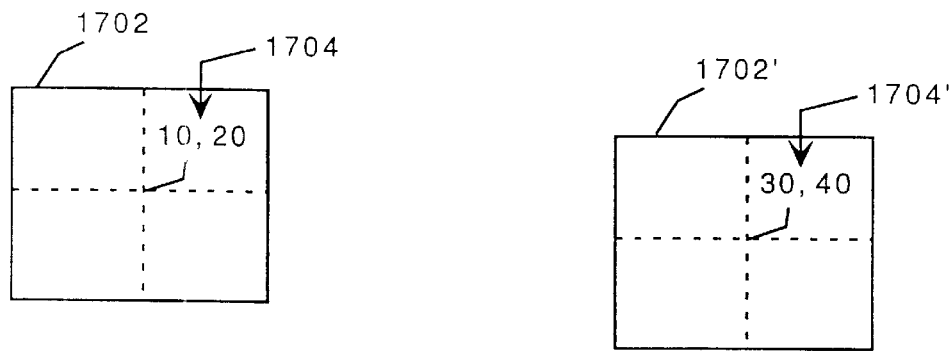
FIG. 17B is a diagram of a location override applied to an object in accordance with the method illustrated in FIG. 15.

FIG. 15 is a logic flow diagram illustrating routine 1340 for determining a location override and FIG. 17B illustrates a location override. In step 1502, the Page Manager 106 determines whether the object in the destination layout (WIZ-L2 126) has the same location, within a certain tolerance, as the corresponding object in the source layout (WIZ-L1 118). If the object in the destination layout does have the same location as the corresponding object in the source layout, the "YES" branch is followed to step 1504, in which the Page Manager 106 stores the location of the corresponding object in the current publication (PUB-L1 114) as a location override. Step 1504, as well as the "NO" branch from step 1502, are followed by the, "RETURN" step 1508, which exits routine 1304 and returns to step 1306 shown on FIG. 13. Thus, the Page Manager 106 stores a location override for a particular object if the object in the source layout (WIZ-L1 118) has the same location, within a certain tolerance, as the corresponding object in the destination layout (WIZ-L2 126).

Routine 1306 is also facilitated by the data structure illustrated in FIG. 18. As shown in FIG. 17B, the location of every object is defined by an absolute center, which is located at the center of the rectangular area within which the contents of the object is displayed. The absolute center is assigned a coordinate position with respect to a fixed coordinate system for the publisher program 100. For example, the location of an object in the source layout (WIZ-L1 118) is defined by the absolute center 1704, which is at coordinate position (10, 20) at the center of the rectangular area 1702. The location of the corresponding object in the current publication (PUB-L1 114) is defined bey the absolute center 1704', which is at coordinate position (30, 40) at the center of the rectangular area 1702'. A location override may be fully described by the coordinate position of the absolute center of an object in the source layout (WIZ-L1 118) and the absolute center of the corresponding object in the, current publication (PUB-L1 114). The location override illustrated in FIG. 17A may therefore be represented by the coordinate positions (10, 20) and (30,40), as shown on line 1802 of the data structure shown in FIG. 18.

Figure 16:
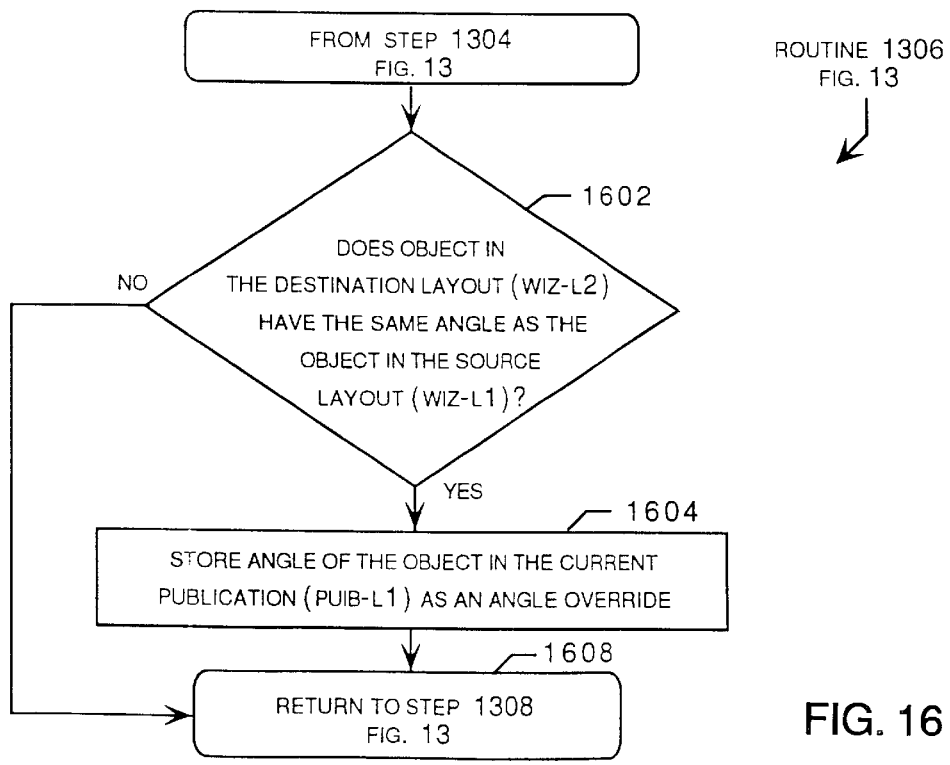
FIG. 16 is a logic flow diagram illustrating a routine for determining angle overrides for a publication in the publisher program shown in FIG. 2.
Figure 17C:
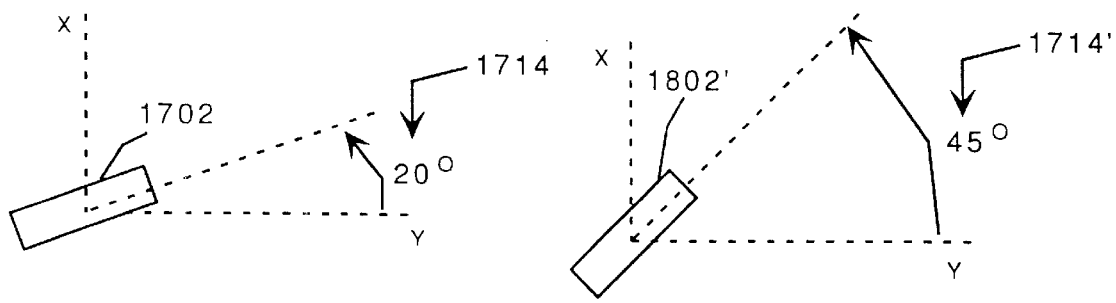
FIG. 17C is a diagram of an angle override applied to an object in accordance with the method illustrated in FIG. 16.

FIG. 16 is a logic flow diagram illustrating routine 1306 for determining an angle override and FIG. 17C illustrates an angle override. In step 1602, the Page Manager 106 determines whether the object in the destination layout (WIZ-L2 126) has the same angle, within a certain tolerance, as the corresponding object in the source layout (WIZ-L1 118). If the object in the destination layout does have the same angle as the corresponding object in the source layout, the "YES" branch is followed to step 1604, in which the Page Manager 106 stores the angle of the corresponding object in the current publication (PUB-L1 114) as an angle override. Step 1604, as well as the "NO" branch from step 1602, are followed by the "RETURN" step 1608, which exits routine 1306 and returns to step 1308 shown on FIG. 13. Thus, the Page Manager 106 stores an angle override for a particular object if the object in the source layout (WIZ-L1 118) has the same location, within a certain tolerance, as the corresponding object in the destination layout (WIZ-L2 126).

Routine 1308 is also facilitated by the data structure illustrated in FIG. 18. As shown in FIG. 17C, the angle of every object is defined by an angle for the object the fixed coordinate system for the publisher program 100. For example, the angle of an object in the source layout (WIZ-L1 118) is defined by the 20° angle 1714. And the location of the corresponding object in the current publication (PUB-L1 114) is defined by the 45° angle 1714'. An angle override may be fully described by the angle of the object in the source layout (WIZ-L1 118) and the angle of the corresponding object in the current publication (PUB-L1 114). The angle override illustrated in FIG. 17A may therefore be represented by the angles 20° and 45°, as shown on line 1802 of the data structure shown in FIG. 18. The data record for each object also includes the absolute height and width of the source object, which is used in determining which override to apply for a particular destination object. It should be appreciated that for each object, a set of overrides as shown in FIG. 18 may be saved for any number of layouts or groups of layouts for which the dimensions of the object are similar. Each object may have a different number of overrides stored in the data structure shown in FIG. 18. And each individual object may have a different number of size overrides, location overrides, and angle overrides stored in the data structure shown in FIG. 18. Although not shown, one or more formatting overrides, a "Sample Content" flag, a scenario set identifier, and other pertinent parameters may also be associated with each individual object in the data structure shown in FIG. 18.

FIG. 19 is a logic flow diagram illustrating routine 1118 for applying position overrides to an object in the new publication (PM-L2 128). In step 1902, the Page Manager 106 applies the size overrides that were saved in routine 1302. In step 1904, the Page Manager 106 applies the location overrides that were saved in routine 1304. And in step 1909, the Page Manager 106 applies the angle overrides that were saved in routine 1302. Step 1906 is followed by the "RETURN" step 1908, which exits routine 1118 and returns to step 1120 shown in FIG. 11.

As noted previously, there may be multiple size, position, and angle overrides stored for each object. Therefore, the Page Manager 106 may have to select among a plurality of overrides for a particular object. In general, the Page Manager 106 makes this selection by comparing the source object as rendered by the Wizard 104 (i.e., the object in WIZ-L2 126) to the source objects (i.e., the Wizard-produced objects with the same name) for the stored overrides. If no override that corresponds to a source object matches the source object to be morphed within a predefined tolerance, then the Page Manager 106 does not apply an override to the object. If there is only one override that corresponds to a source object that matches the source object to be morphed closely enough, then the Page Manager 106 applies this override to the object.

And if there are more than one override that correspond to source objects that match the source object to be morphed closely enough, then the Page Manager 106 selects the override that corresponds to the source object that matches most closely to the source object to be morphed. In other words, each override corresponds to a Wizard-produced object that was changed by the author, and the Page Manager 106 selects the override that has a corresponding source object that most closely matches the source object to be morphed. This causes the Page Manager 106 to morph a Wizard-produced object in the same manner that the author altered the most similar object that was previously produced by the Wizard 104.

More specifically, in step 1902 size overrides are applied on an object-by-object basis by comparing the object to be morphed in WIZ-L2 126 to stored overrides for objects with the same name. The Page Manager 106 selects the size override that corresponds to the source object having dimensions that most closely match the dimensions of the source object to be morphed, provided that the match is within a predefined tolerance. That is, the Page Manager 106 looks through the list of size overrides for one whose source dimensions most closely match the dimensions of the source object with the same name in WIZ-L2 126. If there is a size override that matches within a predefined tolerance, then the Page Manager 106 applies the stored edge values to the object with the same name in PM-L2 128. If no matching overrides are found, then the object in PM-L2 128 is given the size set by the Wizard 104 (i.e., the size of the object in WIZ-L2 126).

The Page Manager 106 preferably selects or computes a measurement criteria for determining the "closeness" between the object to be morphed and the source objects of overrides. For example, the Page Manager 106 may determine how closely a size override matches by comparing the proportions; (i.e., height as a percentage of width) of the object in WIZ-L2 126 and the source objects for the stored overrides. Other criteria may equivalently be used, such as the absolute height, absolute width, the area, a computed indent based on these and other parameters, etc.

Similarly, in step 1904, the Page Manager 106 looks through all of the angle overrides stored for a particular object. If there is not an angle for an override having a FROM portion that matches the angle of the object in WIZ-L2 126, within a predefined threshold, then the Page Manager 106 does not apply an angle override to the object. Thus, in this case, the object appears in PM-L2 128 with the angle set by the Wizard 104 (i.e., the with the angle of the object in WIZ-L2 126). If the FROM portion of any angle override matches the angle of the object in WIZ-L2 126, within a predefined threshold, then the Page Manager 106 applies the TO portion of the angle override to tie object with the same name in PM-L2 128.

And in step 1906, the Page Manager 106 looks through all of the position overrides stored for a particular object. If there is not an position (i.e., the center or midpoint of the rectangle) for an override having a FROM portion that matches the position of the object in WIZ-L2 126, within a predefined threshold, then the Page Manager 106 does not apply a position override to the object. Thus, in this case, the object appears in PM-L2 128 at the position set by the Wizard 104 (i.e., at the position of the object in WIZ-112 126). If the FROM portion of any position override matches the position of the object in WIZ-L2 126, within a predefined threshold, then the Page Manager 106 applies the TO portion of the position override to the object with the same name in PM-L2 128.

The invention thus provides an improved publisher program that allows the author of a content-filled document to use a menu-driven utility to automatically change the layout the document. It should be understood that the amount of the tolerance for the size, location, and angle overrides described above may be set by the program developers, or they may adjustable by individual authors. In particular, it is anticipated that more sophisticated authors may find the ability to adjust the tolerances advantageous. In fact, the tolerance for the size, location, and angle overrides may be separately adjustable, and may be adjustable on a per-document basis. In addition, a default tolerance, such in the range of 80–90% may be selected by the program developers. It should also be appreciated that the criteria for determining whether to store size, location, and angle overrides described above is just one example. Many different criteria may be developed and applied in connection with the present invention.

It should be understood that the foregoing relates only to specific embodiments of the invention, and that numerous changes may be made therein without departing from the spirit and scope of the invention as defined by the following claims.

What is claimed is:

1. A computer-readable medium having computer-readable instructions for performing steps comprising:

receiving a first layout selection user input;

querying the user to answer a first set of menu-driven questions relating to the first layout;

receiving user input answering the first set of menu-driven questions to define a first scenario for the document;

rendering the first scenario for the document in the first layout;

receiving user changes to define content for the document while the document is in the first layout;

receiving a second layout selection user input;

querying the user to answer a second set of menu-driven of questions relating to the second layout;

receiving user input answering the second set of menu-driven questions to define a second scenario for the document; and automatically applying the second layout to the document while preserving the user changes by rendering the second scenario for the document in the second layout and adding the user changes to the second scenario.

2. The computer-readable medium of claim 1, wherein the first and second layouts comprise named objects such that objects that have similar purposes in the two layouts have the same name.

3. The computer-readable medium of claim 1, wherein:

the step of receiving user input to define the first layout for the document comprises the step of receiving user input from a menu-driven layout utility to define the first layout for the document; and the step of receiving user input to define the second layout for the document comprises the step of receiving user input from the menu-driven layout utility to define the second layout for the document.

4. The computer-readable medium of claim 1, wherein:

the step of automatically applying the second layout to the document while preserving the user-defined attributes of the content comprises the step of changing the position and formatting of content associated with an object.

5. The computer-readable medium of claim 4, wherein the position and formatting of the content associated with the object are defined by default parameters assigned to the content associated with the object in response to the input from the menu-driven layout utility to define the second layout for the document.

6. The computer-readable medium of claim 1, wherein:

the user-defined attributes of the content including the formatting and position of content associated with an object; and the step of automatically applying the second layout to the document while preserving the user-defined attributes of the content comprises the step of preserving the position and formatting of the content associated with the object.

7. The computer-readable medium of claim 6, wherein the position and formatting of the content associated with the object are defined by user-selected parameters assigned to the content in response to the input from the menu-driven layout utility to define the second layout for the document.

8. The computer-readable medium of claim 1, wherein the step of automatically applying the second layout to the document while preserving the user-defined attributes of the content comprises the steps of:

applying formatting changes;

applying position changes; and applying content changes.

9. The computer-readable medium of claim 8, wherein the step of automatically applying position changes further comprises the steps of:

automatically applying size changes;

automatically applying location changes; and automatically applying angle changes.

10. The computer-readable medium of claim 9, wherein the step of automatically applying size changes further comprises the steps of:

determining whether the proportions of an object in the document in the first layout prior to user changes are similar to the proportions of a corresponding object in the document in the second layout; and if the proportions of the object in the document in the first layout prior to user changes are similar to the proportions of the corresponding object in the document in the second layout, applying user changes received for the object in the document in the first layout to the corresponding object in the document in the second layout.

11. The computer-readable medium of claim 9, further comprising the steps of:

determining whether an object in the document in the first layout overlaps the object after the user changes have been applied to the object; and if the object in the document in the first layout overlaps the object after the user changes have been applied to the object, storing the user changes received for the object in the document in the first layout as an override for application to the corresponding object in the document in the second layout.

12. The computer-readable medium of claim 9, wherein the step of automatically applying size changes further comprises the steps of:

determining a first set of proportionate edge values for an object in the document in the first layout prior to user changes;

applying one of the user changes to the object;

determining a second set of proportionate edge values for the object after the user change has been applied to the object, the second set of proportionate edge values being defined with respect to the first set of proportionate edge values; and storing the second set of proportionate edge values as a user-defined change for the object.

13. The computer-readable medium of claim 12, further comprising the step of storing the absolute dimensions of the object in the first layout in association with the user-defined change for the object.

14. The computer-readable medium of claim 9, wherein the step of automatically applying location changes further comprises the steps of:

determining whether the location of an object in the document in the first layout prior to user changes is similar to the location of a corresponding object in the document in the second layout; and if the location of the object in the document in the first layout prior to user changes is similar to the location of the corresponding object in the document in the second layout, applying user changes received for the object in the document in the first layout to the corresponding object in the document in the second layout.

15. The computer-readable medium of claim 9, wherein the step of automatically applying angle changes further comprises the steps of:

determining whether the angle of an object in the document in the first layout prior to user changes is similar to the angle of a corresponding object in the document in the second layout; and if the angle of the object in the document in the first layout prior to user changes is similar to the angle of the corresponding object in the document in the second layout, applying user changes received for the object in the document in the first layout to the corresponding object in the document in the second layout.

16. The computer-readable medium of claim 1, further comprising the steps of:

in response to receiving the input from the menu-driven layout utility defining the first layout for the document, creating a source object list defining the first layout for the document;

in response to receiving user changes to define content for the document while the document is in the first layout, creating a current publication object list for the document including the content;

in response to receiving the input from the menu-driven layout utility defining the second layout for the document, creating a destination object list defining the second layout for the document;

comparing the source object list to the current publication object list;

storing any differences between objects in the source object list and corresponding objects in the current publication object list; and comparing the destination object list to the current publication object list, for an object named in the current publication object list that has a corresponding object in the destination object list, changing the object in the current publication object list to match the corresponding object in the destination object list while preserving user-defined attributes associated with the object, for an object named in the current publication object list that has no corresponding object in the destination object list, deleting the object from the current publication and storing any user-defined attributes associated with the object, and for an object named in the destination object list that has no corresponding object in the current publication object list, adding the object to the current publication object list and applying any previously-saved user-defined attributes associated with the object.

17. A computer-readable medium having computer-readable instructions comprising:

a menu-driven utility for receiving a first layout selection user input, querying the user to answer a first set of menu-driven questions relating to the first layout, and receiving user input answering the first set of menu-driven questions to define a first scenario for the document;

a first program module for rendering the first scenario for the document in the first layout;

an editor for altering the first document in response to user changes;

the menu-driven utility being further operable for receiving a second layout selection user input, querying the user to answer a second set of menu-driven of questions relating to the second layout, and receiving user input answering the second set of menu-driven questions to define a second scenario for the document;

the first program module being further operable for rendering the second scenario for the document in the second layout in response to the second set of user selections; and a second program module for automatically applying to the second document the user changes received for the first document by rendering the second scenario for the document in second layout and adding the user changes to the second scenario.

18. The computer-readable medium of claim 17, wherein the second program module comprises a predefined function that is operable for accepting four object lists and morphing the first three object lists to the fourth object list.

19. The computer-readable medium of claim 17, wherein the second program module comprises a predefined function that is operable for accepting two object lists and detecting objects that are different in the second object list with respect to the first object list.

20. The computer-readable medium of claim 17, wherein the second program module comprises a predefined function that is operable for accepting, two object lists and detecting format-related object properties that are different in the second object list with respect to the first object list.

21. The computer-readable medium of claim 17, wherein the second program module comprises a predefined function that is operable for accepting two object lists and detecting position-related object properties that are different in the second object list with respect to the first object list.

22. The computer-readable medium of claim 17, wherein the second program module comprises a predefined function that is operable for accepting an object list and assigning names to unnamed objects that appear in the object list.

23. The computer-readable medium of claim 17, wherein the second program module comprises a predefined function that is operable for accepting a first object list and a page list for a second object list and adding pages to the first object list for any pages that are in the page list but are not in the first object list.

24. The computer-readable medium of claim 17, wherein the second program module comprises a predefined function that is operable for accepting an object list and an object name, and deleting the named object from the object list.

25. The computer-readable medium of claim 17, wherein the second program module comprises a predefined function that is operable for accepting an object list and an object, and adding the named object to the object list.

26. The computer-readable medium of claim 17, wherein the second program module comprises a predefined function that is operable for accepting a source object and a destination object, and modifying the content of the source, object to match the content of the destination object.

27. The computer-readable medium of claim 17, wherein the second program module comprises a predefined function that is operable for accepting an object list defining a plurality of pages and deleting any pages that include no subject matter.

28. The computer-readable medium of claim 17, wherein the second program module comprises a predefined function that is operable for accepting any two objects that have the same name and modifying the formatting and position of the second object to correspond to the formatting and position of the first object.

29. The computer-readable medium of claim 17, wherein the second program module comprises a predefined function that is operable for accepting an object list defining a plurality of pages and returning a page list that is sorted by the order the pages should appear in a corresponding document.

30. The computer-readable medium of claim 17, wherein the second program module comprises a predefined function that is operable for accepting any two objects and storing the property differences in a data file.

31. A computer-storage medium having a plurality of data fields stored on the medium and representing a data structure, comprising:
   a plurality of records, each record corresponding to an object in a document created by a publisher program, the document comprising a plurality of layouts for the document; and
   each record comprising,
      a size data field for defining the size of the object in a particular one of the layouts,
      a location data field for defining the location of the object in the particular layout, and
      an angle data field for defining the angle of the object in the, particular layout.

32. The data structure of claim 31, further comprising a field for defining the absolute size of the object prior to a user-defined change that defined the size of the object in the particular layout.

33. The data structure of claim 31, wherein the size field further comprises proportionate edge values that define a rectangular area within which content associated with the object is displayed in the particular layout.

34. The data structure of claim 33, wherein the proportionate edge values comprise a left edge value, a top edge value, a right edge value, and a bottom edge value.

35. The data structure of claim 32, wherein the location data field further comprises a coordinate value defining the location of the object.

36. The data structure of claim 32, wherein the angle data field further comprises an angle value defining the angle of the object.

* * * * *